United States Patent
Sul et al.

(10) Patent No.: US 6,639,380 B2
(45) Date of Patent: Oct. 28, 2003

(54) METHOD AND SYSTEM OF SENSORLESS FIELD ORIENTATION CONTROL FOR AN AC MOTOR

(76) Inventors: Seung-ki Sul, 1543-3, Sillim-Dong, Kwanak-Gu, Seoul (KR); Jung-ik Ha, 66-89, Bongchun-6-Dong, Kwanak-Gu, Seoul (KR)

(*) Notice: Subject to any disclaimer, the term of this patent is extended or adjusted under 35 U.S.C. 154(b) by 14 days.

(21) Appl. No.: 10/115,358

(22) Filed: Apr. 3, 2002

(65) Prior Publication Data

US 2003/0006723 A1 Jan. 9, 2003

Related U.S. Application Data

(63) Continuation-in-part of application No. 09/668,932, filed on Sep. 25, 2000, now abandoned.

(51) Int. Cl.[7] .................................................. H02P 1/24
(52) U.S. Cl. ....................... 318/727; 318/700; 318/800; 318/254; 318/439
(58) Field of Search .................................. 310/727, 700, 310/800, 801, 802, 803, 799, 254, 439

(56) References Cited

U.S. PATENT DOCUMENTS

| | | | |
|---|---|---|---|
| 4,137,489 A | * | 1/1979 | Lipo ........................... 318/798 |
| 4,814,677 A | | 3/1989 | Plunkett |
| 5,144,564 A | | 9/1992 | Naidu et al. |
| 5,278,485 A | | 1/1994 | Kim |
| 5,334,923 A | | 8/1994 | Lorenz et al. |
| 5,559,419 A | | 9/1996 | Jansen et al. |
| 5,886,498 A | | 3/1999 | Sul et al. |
| 6,008,618 A | | 12/1999 | Bose et al. |
| 6,069,467 A | * | 5/2000 | Jansen ......................... 318/802 |
| 6,137,258 A | | 10/2000 | Jansen |
| 6,281,659 B1 | | 8/2001 | Giuseppe |
| 6,531,843 B2 | * | 3/2003 | Iwaji et al. .................. 318/727 |

* cited by examiner

*Primary Examiner*—Karen Masih
(74) *Attorney, Agent, or Firm*—The Maxham Firm

(57) ABSTRACT

A field orientation control method for an AC motor, which includes assuming an arbitrary axis as an estimated control axis in the synchronously rotating reference frame; injecting a high-frequency fluctuating signal to the estimated control axis; determining the position of a control axis using current, voltage or impedance on the estimated control axis in the synchronously rotating reference frame, generated by the injected high-frequency signal; and determining the position and speed of the rotor based on the control axis thus located. Since this method uses the variation of impedance caused by the induction machine's generation of field and by various shapes, the control performance is more stable than other conventional control methods. This AC motor's control method may be applied to control of torque, speed and position at a low speed where it is difficult to affix a detector and where a highly efficient operation is required.

24 Claims, 23 Drawing Sheets

METHOD AND SYSTEM OF SENSORLESS FIELD ORIENTATION CONTROL FOR AN AC MOTOR

This application is a continuation-in-part of U.S. application Ser. No. 09/668,932, filed Sep. 25, 2000 now abandoned.

BACKGROUND OF THE INVENTION

1. Field of the Invention

The present invention relates to a method and a system of field orientation control for an AC motor. In particular, the present invention relates to a method and a system for field orientation control of an AC motor which uses the impedance variation of an AC motor at a high-frequency region to control the AC motor. The method and the system of field orientation control may be applied to AC motors, which include induction motors.

2. Description of the Related Art

AC motors generally do not have problems related to frequent maintenance and reparation because there is less abrasion in the brush and commutator parts, as compared to DC motors. Thus, AC motors are increasingly applied to various industrial fields that require high performance control systems.

Such AC motors may control the position and speed of rotors only when the position of the field has been determined. Conventionally, sensors detecting position and speed of rotors, such as rotary encoders, have been used to control the position and speed of such rotors.

However, use of such sensors makes AC motor systems more expensive, due to the installation cost of the sensor for detection of the position and speed of the rotors. Also, the control system becomes complicated because the signals from the detection sensor should be converted into signals which may be processed in the control system. Moreover, signals from such detection sensor are susceptible to electromagnetic noise, often causing trouble in AC motor control system with incorrect information from the detection signals when high-frequency signals are injected to the AC motor.

As the above-described problems with the method of using a sensor to detect position and speed of rotors are recognized, sensorless control methods to orient fields without a detection sensor have also been studied.

There are two major types of sensorless control methods. One is to use back electromotive force and the other is to use magnetic variation of impedance. The control method using the back electromotive force shows high efficiency if the speed is medium to high. However, it has low reliability in performance at the low speed range with comparatively high voltage disturbance, because the magnitude of the back electromotive force is proportional to the rotor's speed. Also, the conventional control methods using the variation of impedance, which inject voltage signals in the middle of sampling cycle or which use rotating high-frequency signals, have demonstrated difficulty in controlling the position and speed of rotors.

SUMMARY OF THE INVENTION

In order to solve the above-mentioned problems, the present invention provides a method and a system thereof for sensorless AC motor control, using high-frequency signals.

The present invention also provides a method and a system thereof for AC motor control having high control efficiency regardless of load conditions, by controlling AC motors through current control on the control axis.

BRIEF DESCRIPTION OF THE DRAWINGS

The above and other objects and advantages of the present invention will become apparent from the following detailed description, when read in conjunction with the accompanying drawing, wherein.

DETAILED DESCRIPTION OF THE PREFERRED EMBODIMENT

Figure 1:
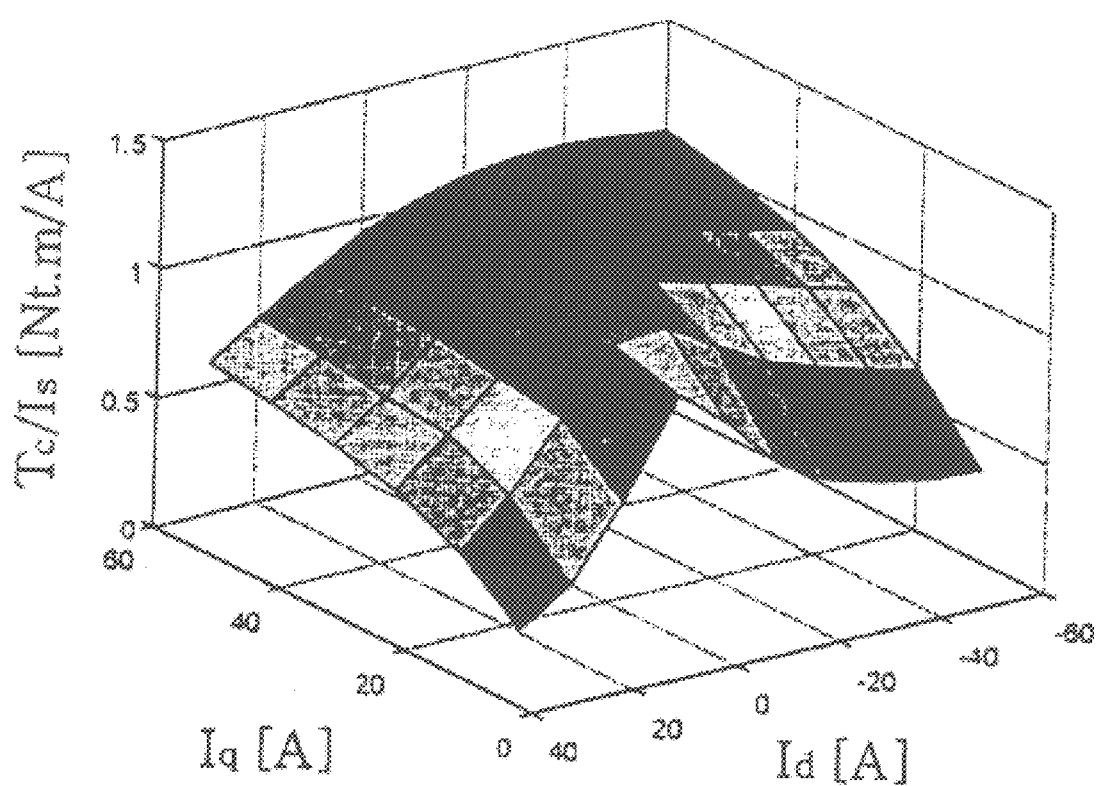
FIG. 1 shows the variation of torque at a unit current depending on different currents on d- and q-axes of an AC motor.

The sensorless AC motor control method according to the present invention assumes an arbitrary axis as an estimated flux axis in the synchronously rotating reference frame, injects a high-frequency fluctuating signal to the estimated flux axis, determines the position of the flux axis using current, voltage or impedance on the estimated flux axis in the synchronously rotating reference frame, generated by the injected high-frequency signal, and determines the position and speed of the rotor based upon the flux axis thus located.

In order to determine the flux axis, it is desirable to use the variation of impedance caused by the error between the actual flux axis and the estimated flux axis, and in order to determine the said flux axis, it is desirable to divide the signal fluctuating on the estimated flux axis into factors on the two measurement axes which are orthogonal to each other and to calculate the motor impedances on such two measurement axes from the factors measured thereon.

Using the difference in the motor impedances thus calculated on such two measurement axes, the flux axis may be determined.

It is preferred that the factors of the signal consist of the first measurement axis whose phase leads the said estimated flux axis by π/4 and the second measurement axis whose phase lags the estimated flux axis by π/4.

When such first and second measurement axes constitute two measurement axes, an estimated flux axis which minimizes the difference in the motor impedances on such two measurement axes is preferably determined to be the flux axis.

The high-frequency fluctuating signal injected to the estimated flux axis in the synchronously rotating reference frame is a voltage input signal, and in such case, the measured value on the said two measurement axes is preferably the current.

The field orientation control system of an AC motor according to the present invention comprises a current controller for injecting constant high-frequency signals to the AC motor, and a field orientation controller which receives the output current of the AC motor, divides the output current from the AC motor into factors on an estimated flux axis and an axis orthogonal to the estimated flux axis, and determines the position and the speed of the actual flux axis by using the difference in the current factors on the estimated flux axis and the axis orthogonal to the estimated flux axis.

The said field orientation controller comprises: an coordinate transformer which receives the output current of the AC motor, converts the stationary reference frame into a synchronously rotating reference frame, and divides the said output current into a factor on the axis which is π/4 behind the estimated flux axis and a factor on the axis which is π/4 ahead of the estimated flux axis; a band pass filter which filters certain frequency bandwidth of the current factors out of the said coordinate transformer; a correction controller which determines the speed of the rotor from the output of the said band pass filter; and an integrator which determines the position of the rotor from the speed of the rotor received from the said correction controller.

A position and speed controller which controls the position and the speed of the rotor in the AC motor may be further included, by using the position and the speed of the actual flux axis determined in the said field orientation controller.

In addition, in the step of determining the flux axis in the present invention, field orientation can be controlled by dividing current or voltage on the estimated flux axis into factors on the two measurement axes in the stationary reference frame and determining the flux axis from the said factors of two measurement axes without any coordinate transform into synchronously rotating reference frame.

In the above step, the phase of one of the two measurement axes in the stationary reference frame is preferably identical to that of one of the components of poly-phase AC power. It is preferred that the said two measurement axes are orthogonal to each other.

The high-frequency fluctuating signal injected to the estimated flux axis in the synchronously rotating reference frame is preferably a voltage input signal, and in such case, the measured value on the said two measurement axes is preferably the current.

Alternatively, the high-frequency fluctuating signal injected to the estimated flux axis in the synchronously rotating reference frame may be a current input signal, and in such case, the measured value on the said two measurement axes is preferably the voltage.

More detailed description of a preferred embodiment of the present invention is provided in the following with the reference to the drawings.

In the preferred embodiment, the difference between the impedances in the flux axis (d-axis) of an AC motor and in the axis orthogonal to such flux axis (q-axis) is used to control the motor. Below is the explanation of impedance difference in such flux axis and the orthogonal axis.

First, the principle for high efficiency in an AC motor is explained.

The torque in an AC motor may be calculated by the following Equation 1.

$$T_e = \frac{3}{4}P[(L_d - L_q)i_d + K_e(i_d)]i_q \quad \text{[Equation 1]}$$

wherein

Ld represents the inductance factor on d-axis;

Lq represents the inductance factor on q-axis;

id represents the current on d-axis;

iq represents the current on q-axis; and

P represents the number of poles.

In an ideal case, the torque of an AC motor will be in accordance with Equation 1.

FIG. 1 shows the variation of torque at a unit current depending on different currents on d- and q-axes of an AC motor.

The actual torque of an AC motor at a unit current is as shown in FIG. 1.

Figure 2:
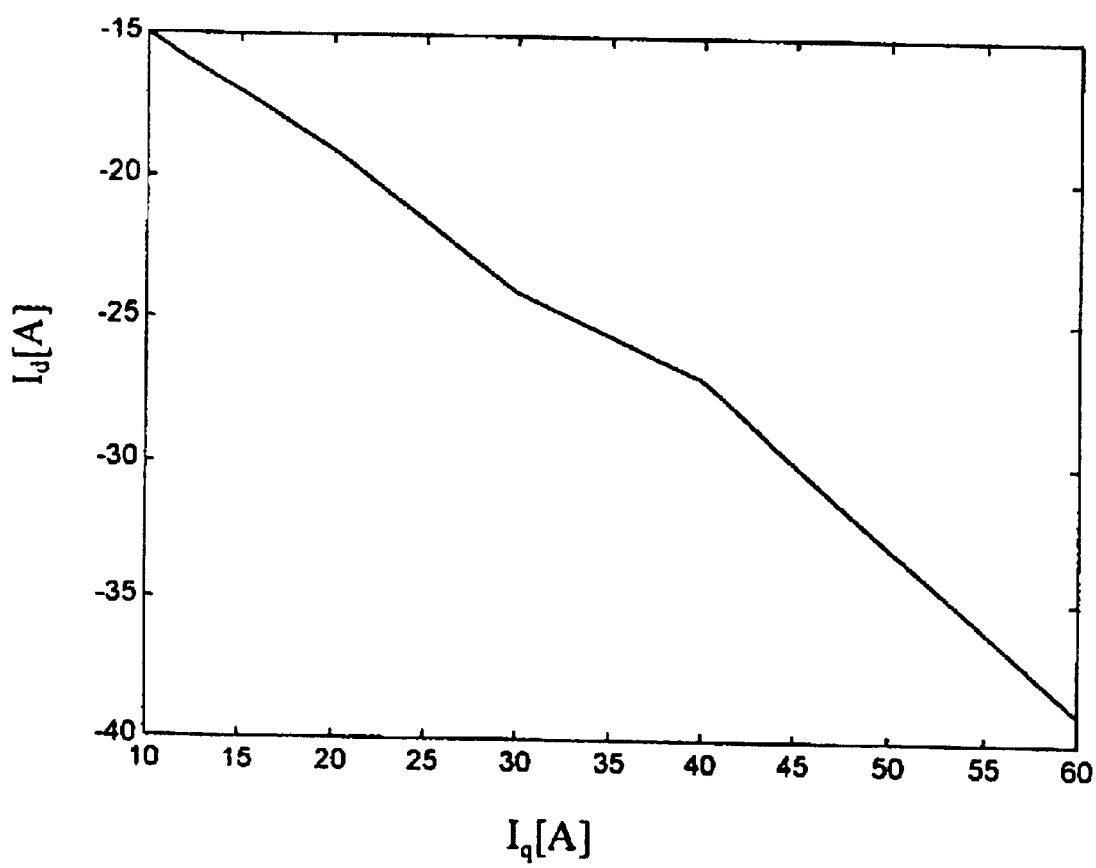
FIG. 2 shows the changes in currents on d-axis depending on the currents on q-axis having the maximum torque per unit current.

FIG. 2 shows the changes in currents on d-axis depending on the currents on q-axis having the maximum torque per unit current.

FIG. 2 is the orthogonal projection of the curve generating the maximum torque of FIG. 1 from the directions of axis Id and axis Iq.

In order to raise the efficiency of an AC motor, the maximum torque per unit current must be generated. Thus, if the current on d-axis is controlled in accordance with the graph shown in FIG. 2, high efficiency of the AC motor may result.

The variation of impedance in an AC motor is explained below using a voltage equation of an AC motor.

Equation 2 is an equation for stator terminal voltage of an AC motor.

$$v_q = R\ i_q + L_q p\ i_q - \omega_r L_d i_d$$
$$v_q = R\ i_q + L_q p\ i_q + \omega_r [L_d i_d + K_e(i_d)] \qquad \text{[Equation 2]}$$

wherein vd represents terminal voltage on d-axis;
vq represents terminal voltage on q-axis;
R represents stator phase resistance;
Ld represents inductance on d-axis;
Lq represents inductance on q-axis
P represents time constant or differential operator;
id represents current on d-axis;
iq represents current on q-axis;
Ke represents back EMF(electromotive force) constant; and
$\omega_r$ represents angular speed of the rotor.

Here, the voltage factor depending on the speed in the operation region of zero or low frequency level may be disregarded because the value of such voltage is very low (i.e., $\omega_r \square 0$). If high-frequency overlaid signals are injected, the back EMF i.e., $\omega_r K_e$ may be disregarded because there is no high-frequency component. Also, cross-coupling i.e., $\omega_r L_d$ may be disregarded because the speed of the motor is much lower compared to the frequency of the injected signal. Therefore, the stator voltage equation and the impedance at the high-frequency region would be as described with Equations 3 and 4 respectively.

$$\begin{bmatrix} v_{dh} \\ v_{qh} \end{bmatrix} = \begin{bmatrix} r_{dh} + L_{dh}p & 0 \\ 0 & r_{qh} + L_{qh}p \end{bmatrix}\begin{bmatrix} i_{dh} \\ i_{qh} \end{bmatrix} \equiv \begin{bmatrix} z_{dh} & 0 \\ 0 & z_{qh} \end{bmatrix}\begin{bmatrix} i_{dh} \\ i_{qh} \end{bmatrix} \qquad \text{[Equation 3]}$$

$$Z_{dh}\left(\frac{v_{dh}}{i_{dh}}\right) = r_{dh} + L_{dh}p \qquad \text{[Equation 4]}$$
$$Z_{qh}\left(\frac{v_{qh}}{i_{qh}}\right) = r_{qh} + L_{qh}p$$

wherein $Z_{dh}$ and $Z_{qh}$ represent the impedance on d-axis and q-axis at the injected frequency respectively;

$L_{dh}$ and $L_{qh}$ represent the inductance on d-axis and q-axis at the injected frequency respectively; and $r_{dh}$ and $r_{qh}$ represent the resistance on d-axis and q-axis at the injected frequency respectively.

An AC motor showing the variation of impedance by the shape of a synchronous reluctance machine (SYRM) or an interior permanent magnet machine (IPMM), or an AC motor showing the variation of impedance by the generated flux such as IM(induction motor) or SMPMM(Surface Mounted Permanent Magnet Machine) will have different high-frequency impedance values on d-axis and on q-axis, as demonstrated by Equation 4.

The high-frequency impedance of a motor's stator with respect to an arbitrary angle in a stationary reference frame is equal to the difference between the impedances on d-axis and q-axis of the synchronously rotating reference frame. Such impedance may be deduced from Equation 3 and may be expressed as in Equation 5.

$$Z_h(\theta_r) = Z_{ha} - \frac{1}{2}Z_{hp}\cos 2(\theta_r + \Phi) \qquad \text{[Equation 5]}$$

wherein

Zdh represents average value of the high-frequency impedances;

Zdh represents peak value of the high-frequency impedances;

$\phi$ represents the angle at the minimum high-frequency impedance; and $\theta^r$ represents position of the actual rotor(flux axis).

Figure 3:
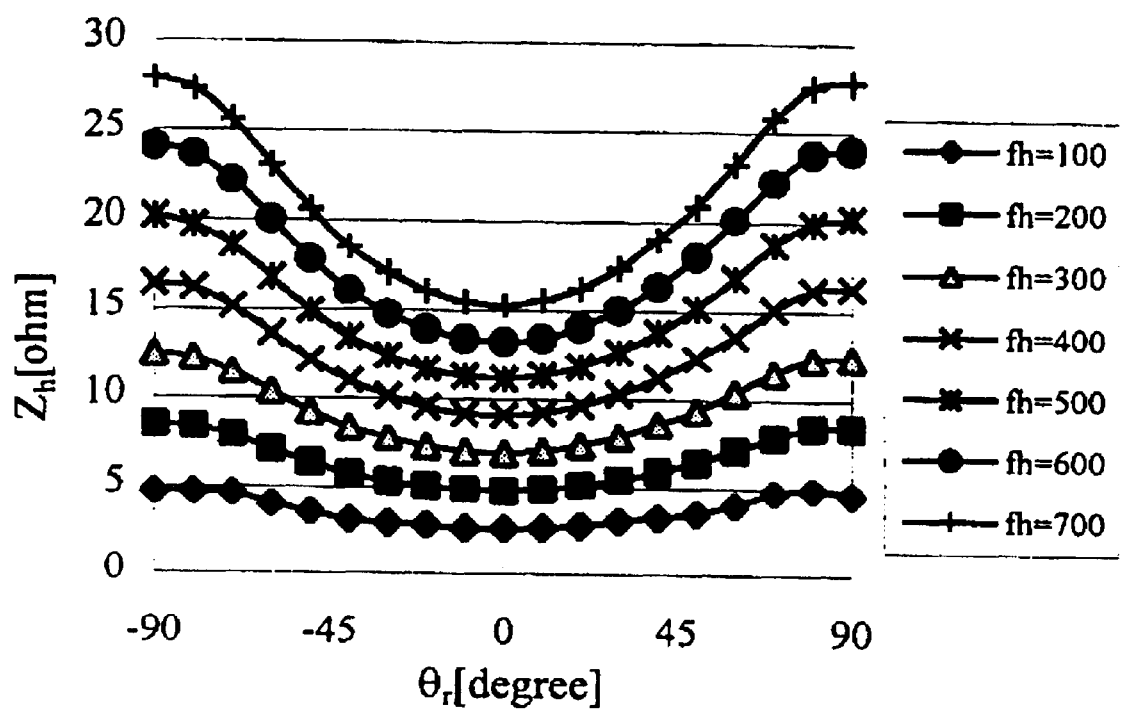
FIG. 3 shows the terminal impedance depending on the rotor position at the no load condition of the interior permanent magnet machine (IPMM) according to Equation 5.

FIG. 3 shows terminal impedance depending on the rotor position at no load condition of the interior permanent magnet machine (IPMM) in accordance with Equation 5.

As shown in FIG. 3, as the frequency increases, the impedance difference in Equation 4 increases.

Figure 11:
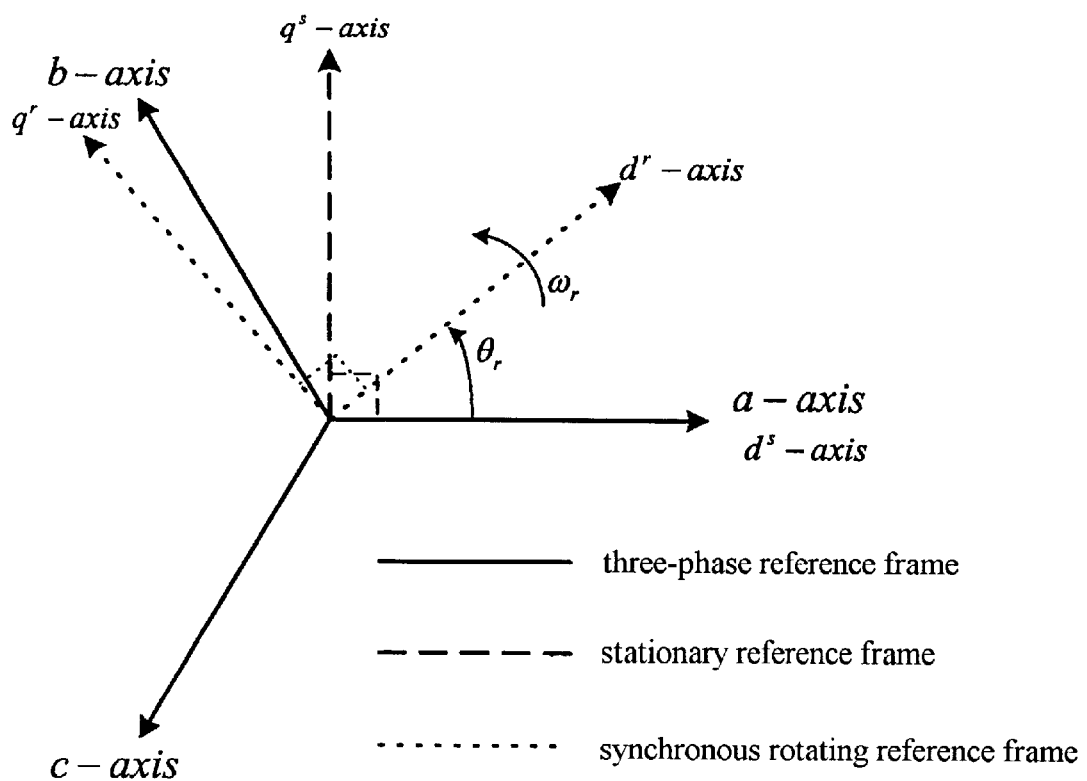
FIG. 11 shows the relation among stationary reference frame, synchronously rotating reference frame and three-phase reference frame.

The relation among stationary reference frame, synchronously rotating reference frame and three-phase reference frame, which is the reference frame of the output in AC motors, is shown in FIG. 11. Here, $d^s$-axis and $q^s$-axis are the two axes of stationary reference frame; $d^r$-axis and $q^r$-axis are the two axes of synchronously rotating reference frame; and $d^s$-axis is coincident with an axis(e.g., axis a), which is one of the three axes(a-, b-, and c-axes). $\theta_r$, which is the difference between stationary reference frame and synchronously rotating reference frame, is the position of the actual rotor(flux axis) and $\omega_r$, which is the speed of synchronously rotating frame, is the speed of the actual rotor flux axis.

Figure 4:
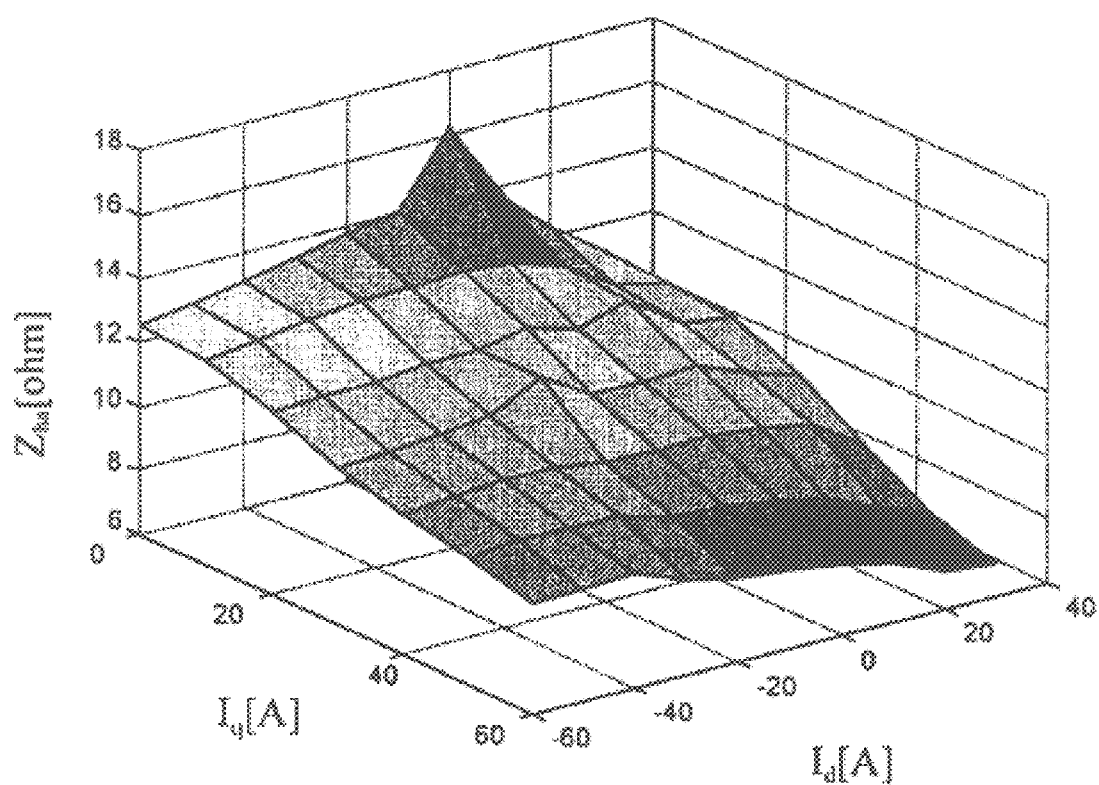
FIG. 4 shows the average value (Zha) of the high-frequency impedances depending on the currents on d- and q-axes.

FIG. 4 shows the average value (Zha) of the high-frequency impedances depending on the currents on d-axis and q-axis.

Figure 5:
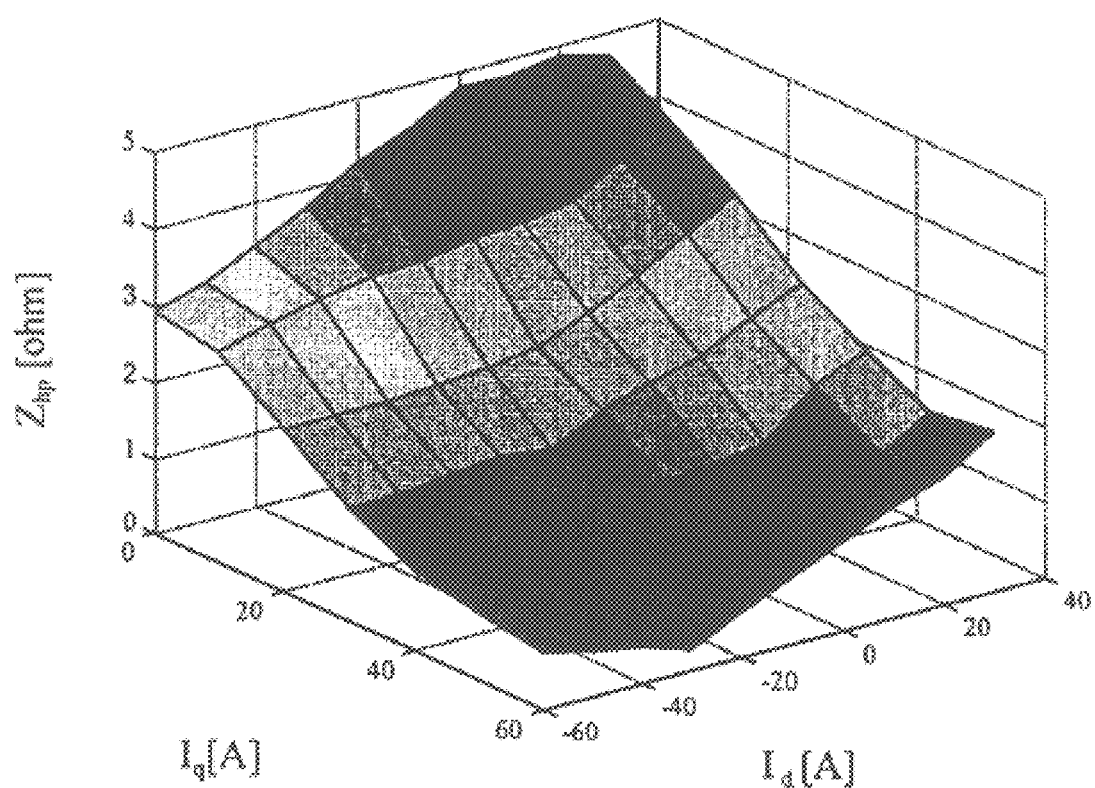
FIG. 5 shows the peak value (Zhp) of the high-frequency impedances depending on the currents on d- and q-axes.

FIG. 5 shows the peak value (Zhp) of the high-frequency impedances depending on the currents on d-axis and q-axis.

Figure 6:
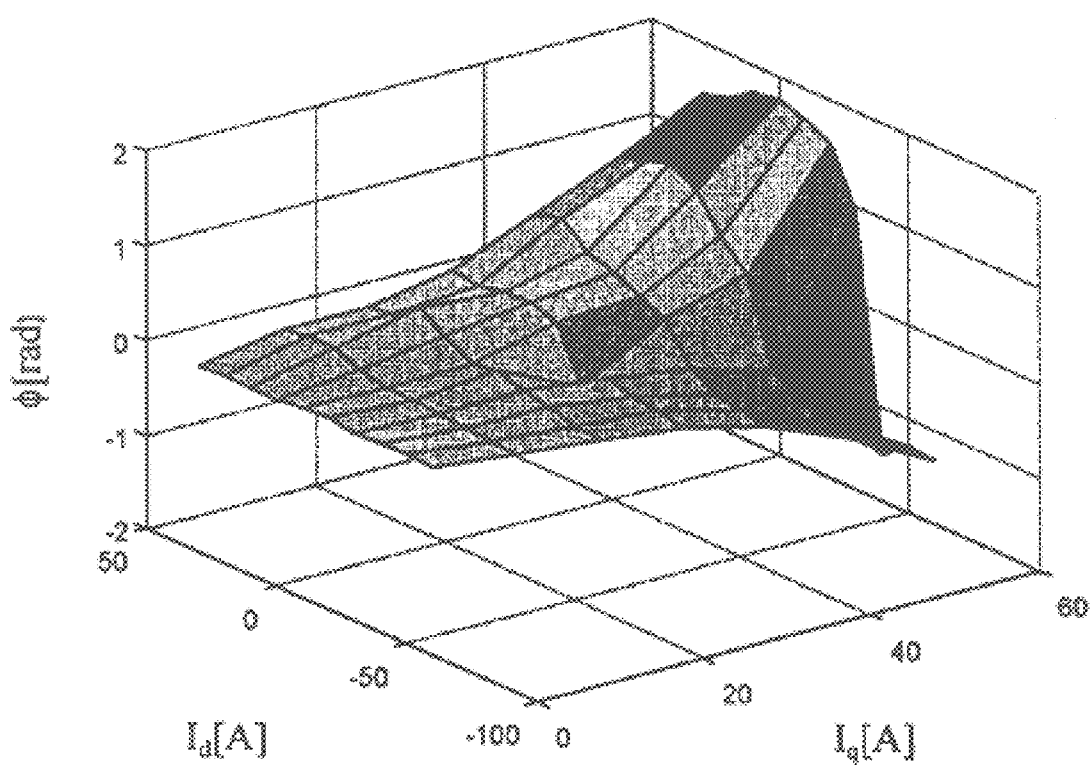
FIG. 6 shows the variation of angle ($\phi$) at the minimum high-frequency impedance, which varies depending on the load torque.

FIG. 6 shows the variation of angle ($\phi$) at the minimum high-frequency impedance depending on the load torque.

The average value of the high-frequency impedances decreases according to the increase in the stator current as shown in FIG. 4 and the peak value of the high-frequency impedances decreases according to the increase in the load current as shown in FIG. 5. These movements occur due to the magnetic saturation. The angle ($\phi$) at the minimum high-frequency impedance moves a little bit according to the change in the stator current as shown in FIG. 6 and this is also caused by the magnetic saturation.

The following are explanations of the operation principle of the present invention determining the position of the flux axis to control the position and the speed of an AC motor using the variation of impedance.

At a high-frequency region, the impedance on the rotating flux axis is greater than the impedance on the axis orthogonal to the rotating flux axis, and such impedances vary depending on the position where the high-frequency signal is injected. Thus, when $\theta$ is 0, in other words, when the high-frequency signal is injected to the rotating flux axis, the impedance on the rotating flux will have the maximum value. Thus, the position of the axis, on which the measured impedance has the maximum value when the high-frequency signal is injected to such axis, is the position of the rotating flux axis. Using this principle, the present invention assumes an estimated flux axis with an arbitrary $\theta$, injects the high-frequency signal to such estimated flux axis, measures the impedance on the estimated flux axis, and searches for the position of an estimated flux axis which has the maximum impedance on such estimated flux axis to determine the position of the flux axis.

Two factors of the maximum impedance on the estimated flux axis, which are π/4 apart from the estimated flux axis, will have the same value. The method according to the present invention, in order to simplify the algorithm to locate the flux axis, assumes an estimated flux axis and divides the estimated flux axis into factors on two measurement axes, both of which are π/4 apart from the estimated flux axis. Then, the present invention searches for an estimated flux axis with an equal value of impedance on two measurement axes. In other words, if the impedances on the two measurement axes have an equal value, the impedance on the estimated flux axis is maximum and such estimated flux axis with the maximum impedance would thus be the actual flux axis.

Figure 7:
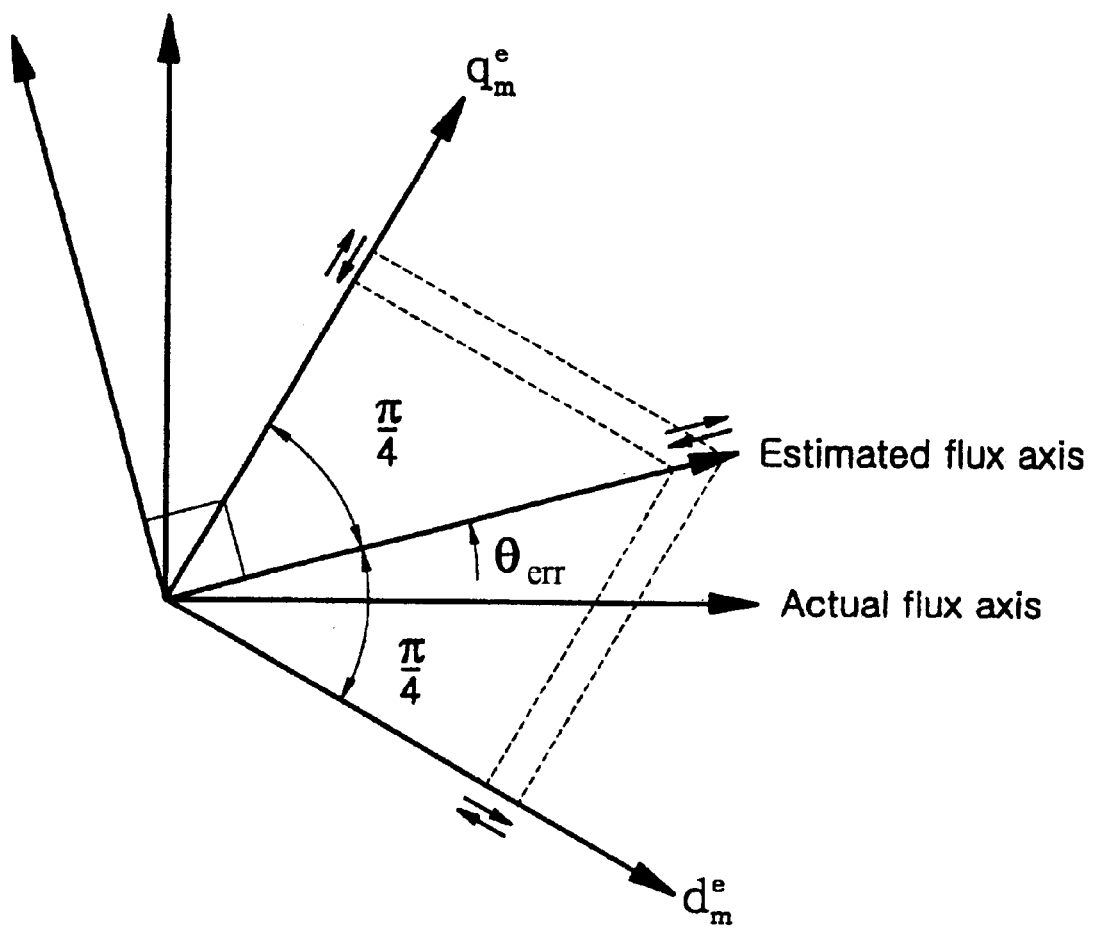
FIG. 7 shows an estimated field axis and measurement axes in the synchronously rotating reference frame.

FIG. 7 shows an estimated field axis and measurement axes in the synchronously rotating reference frame.

As shown in FIG. 7, the high-frequency signal injected to the estimated flux axis is divided into two factors on two orthogonal measurement axes, $d_m^e$, $q_m^e$, which are apart from the estimated flux axis by π/4. The measurement axis $d_m^e$ leads the estimated flux axis by π/4 and the axis $q_m^e$ lags the estimated flux axis by π/4.

If the actual flux axis of the rotor coincides with the estimated flux axis, the signal measured on $d_m^e$ and the signal measured on $q_m^e$ would be equal. However, if the actual flux axis of the rotor does not coincide with the estimated flux axis, the measured signals on two measurement axes would be different from each other.

An AC motor control system using the above-described principle of locating the actual flux axis is explained in the following.

Figure 8:
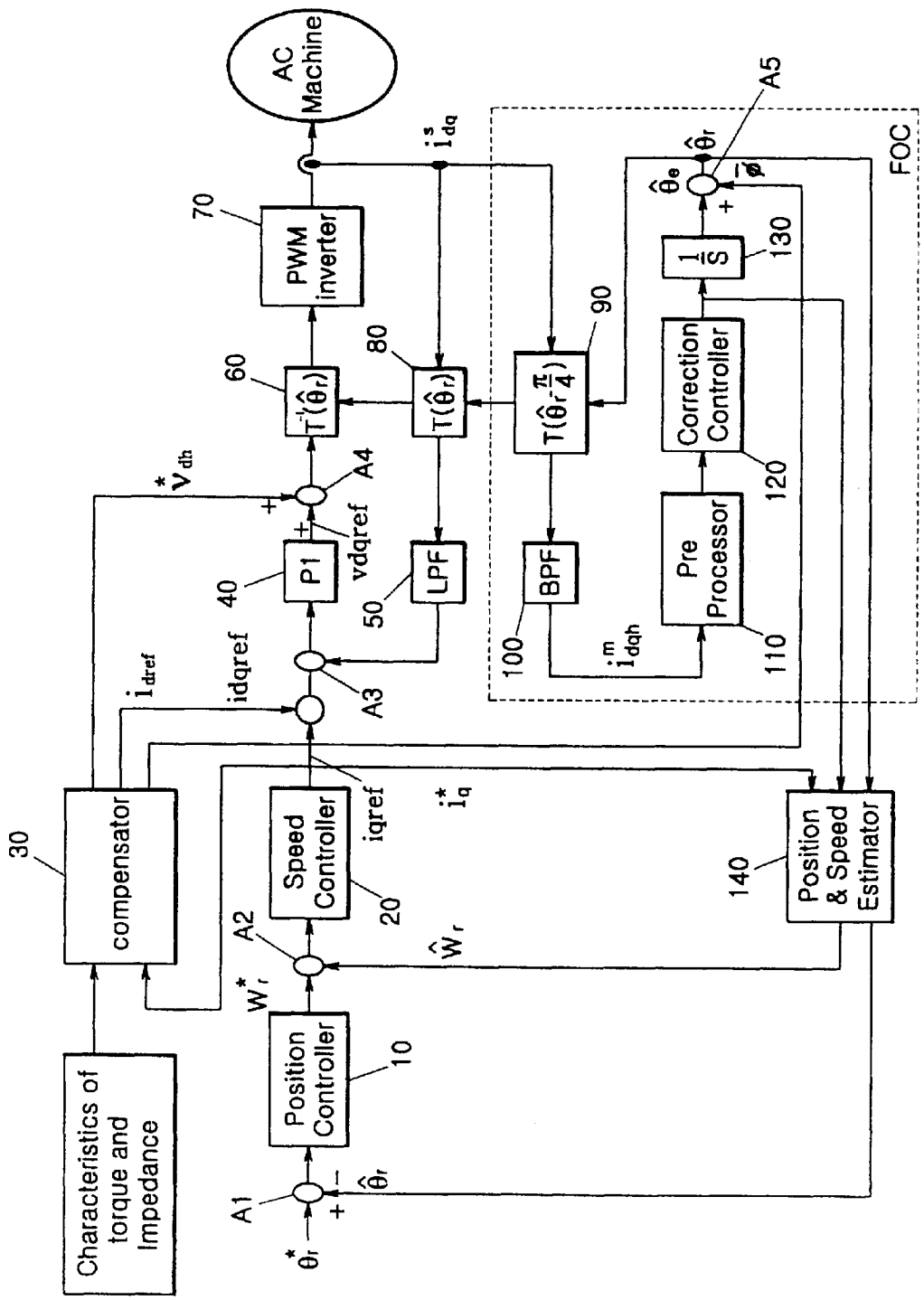
FIG. 8 shows a preferred embodiment of a sensorless AC motor control system.

FIG. 8 shows a preferred embodiment of a sensorless AC motor control system.

As shown in FIG. 8, the sensorless AC motor control system according to the present system comprises a position controller (10), a speed controller (20), a compensator (30), a current controller (CC), a field orientation controller (FOC) and a position-speed estimator (140).

The current controller comprises a PI controller (40), a low pass filter (LPF, 50), a coordinate transformer (60), an inverter (70) and another coordinate transformer (80). The field orientation controller (FOC) comprises a coordinate transformer (90), a band pass filter (100), a pre-processor (110), a correction controller (120) and an integrator (130).

The sensorless AC motor control method of a preferred embodiment of the present invention is explained below with reference to the drawings.

First, the operator (A1) subtracts the estimated rotor position value ($\hat{\theta}_r$) from the rotor position command value ($\theta_r^*$), and inputs the difference thus obtained to the position controller (10). The position controller (10) determines a rotor speed command value ($\omega_r^*$). The operator (A2) subtracts the estimated rotor speed ($\hat{\omega}_r$) from the speed command value ($\omega_r^*$), and inputs the difference thus obtained to the speed controller (20). The speed controller (20) calculates the reference value of the current on q-axis ($i_{qref}$) and outputs it. The multiplexor (MUX) multiplexes the reference value of the current on d-axis ($i_{dref}$) and the reference value of the current on q-axis ($i_{qref}$) designated by the compensator (30), and outputs the combined current reference value on d- and q-axes ($i_{dqref}$)

The current controller controls so that a current of a constant magnitude may be inputted to the stator of an AC motor. More detailed explanation of the current controller is provided in the following.

The operator (A3) determines the difference between the combined current reference value on d- and q-axes ($i_{dqref}$) and the combined current value on the feedback d- and q-axes of the AC motor ($i_{dqf}$), and inputs such difference to the PI controller (40). Based on the inputted value, the PI controller (40) outputs the reference voltage input value on d- and q-axes ($v_{dqref}$). The operator (A4) adds the reference voltage input value on d- and q-axes ($v_{dqref}$) and the high-frequency voltage value injected on d-axis ($v_{dh}^*$), and inputs such added value to the coordinate transformer (60). The coordinate transformer (60) converts the axis of the inputted value from the synchronously rotating reference frame into a stationary reference frame, and outputs such converted voltage value. The inverter (70) performs an appropriate conversion on the AC motor input voltage value, which has been coordinate-transformed, and inputs such converted value to the stator of the AC motor.

The coordinate transformer (80) senses the output current ($i^s_{dq}$) of the AC motor and converts it from the stationary reference frame into the synchronously rotating reference frame. The current converted into the synchronously rotating reference frame passes the low pass filter (LPF, 50). The combined current value on the feedback d- and q-axes of the AC motor ($i_{dqf}$) whose ripple component has been eliminated, is inputted into the operator (A3) as described above. Thus, a current of a constant magnitude may be inputted to the AC motor.

On the other hand, the field orientation controller (FOC) senses the output current ($i_{dq}^s$) of the AC motor and determines the position and the speed of the rotor.

The operation of the field orientation controller is explained below.

The coordinate transformer (90) receives the output current ($i^s_{dq}$) of the AC motor and converts the stationary reference frame into the synchronously rotating reference frame. It divides the output current of the AC motor ($i^s_{dq}$) into factors on the axis π/4 ahead of the measurement axis on the synchronously rotating reference frame and on the axis behind such measurement axis. The current component in a certain high-frequency region ($i_{dqh}^m$) is determined by filtering the coordinate-transformed current through the band pass filter (BPF, 100). Based on such current component, the pre-processor (110) determines the square of the current component on d-axis ($|i_d^m|^2$) and the square of the current component on q-axis ($|i_q^m|^2$).

Figure 9:
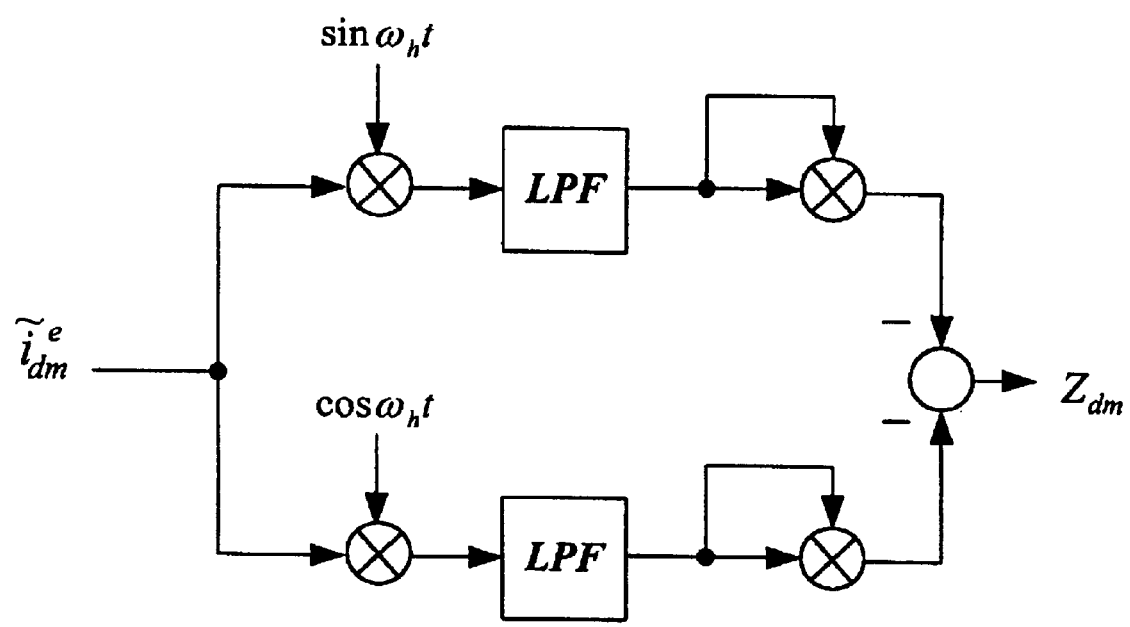
FIG. 9 shows a current pre-processor on d-axis upon injection of voltage of a constant magnitude.

FIG. 9 shows a pre-processor of the current on d-axis upon injection of the voltage of a certain magnitude.

Figure 10:
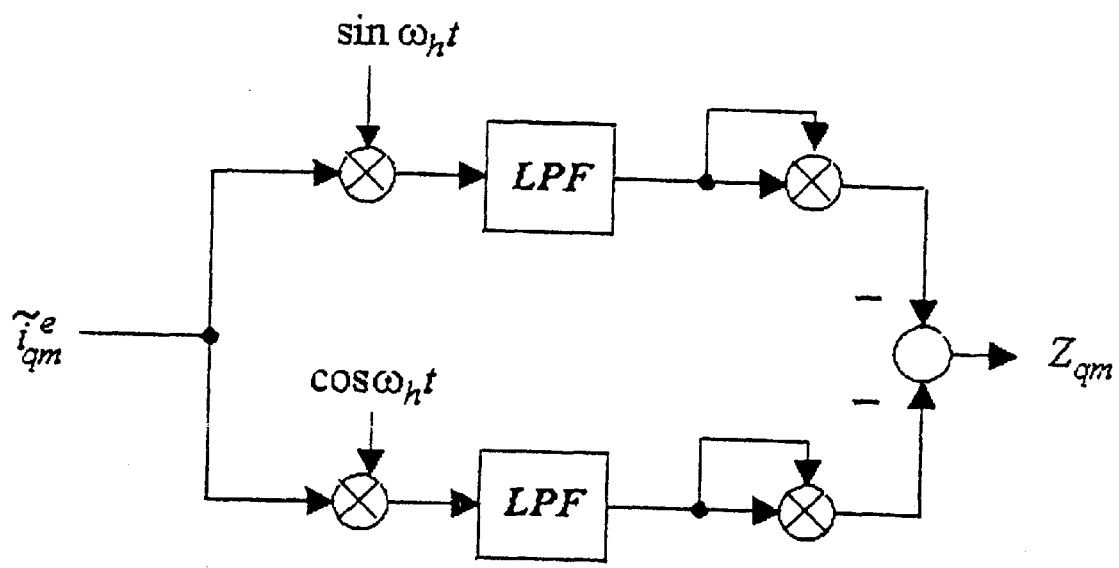
FIG. 10 shows a current pre-processor on q-axis upon injection of voltage of a constant magnitude.

FIG. 10 shows a pre-processor of the current on q-axis upon injection of the voltage of a certain magnitude.

The correction controller (120) uses the square of the current component on d-axis ($|i_d^m|^2$) and the square of the current component on q-axis ($|i_q^m|^2$) to determine the position of the actual rotor flux axis ($\theta_e$). The operation principle of the correction controller (120) is explained in the following.

The input of the correction controller (120) is as represented in the following Equation 6.

$$Err = |i_q^m|^2 - |i_d^m|^2 \approx \frac{V_{dh}^{*2} Z_{hp} \sin 2(\theta_r - \hat{\theta}_r + \phi)}{2(Z_{ha}^2 - Z_{hp}^2 \sin^2 2(\theta_r - \hat{\theta}_r + \phi)/4)^2} \quad \text{[Equation 6]}$$

Here, if the estimation error is small (in other words, $\hat{\theta}_r \approx \theta_r + \phi$), Equation 6 may be approximated to Equation 7.

$$Err \approx \frac{V_{dh}^{*2} Z_{ha} Z_{hp}}{Z_{ha}^4} (\theta_r + \phi - \hat{\theta}_r) \equiv Y_{err}(\theta_r + \phi - \hat{\theta}_r) \quad \text{[Equation 7]}$$

The angle φ with the minimum impedance moves according to the stator current. When the compensation for such angle is made, the frequency response feature of the estimated rotor flux as to the actual rotor flux would be as expressed in the following Equation 8.

$$\frac{\hat{\theta}_e(s)}{\theta_e(s)} = \frac{K_1 s + K_2}{s^2 + K_1 s + K_2} \quad \text{[Equation 8]}$$

The equation for the correction controller is the following Equation 9.

$$G(s) = \frac{1}{s}\left[K_p + \frac{K_1}{s}\right] \quad \text{[Equation 9]}$$

$K_1 = Y_{err} K_p$ $K_2 = Y_{err} K_1$

In accordance with the above-described principle, the correction controller outputs the speed of the rotor flux ($\hat{\omega}_e$).

The integrator (130) integrates the speed of the rotor flux ($\hat{\omega}_e$) to determine the position of the rotor flux ($\hat{\theta}_e$). Thus, the field orientation controller (FOC) can determine the speed of the rotor flux ($\hat{\omega}_e$) and the position of the rotor flux ($\hat{\theta}_e$), using the output current of the motor.

The operator (A5) uses the relation of $\hat{\theta}_e = \hat{\theta}_e - \phi$ to determine the position of the estimated rotor ($\hat{\theta}_r$).

The position and speed estimator (140) compensates the position and speed of the rotor flux determined in the field orientation controller (FOC), considering the slip or noise of the induction motor. It feeds back the compensated value into the operators (A1, A2) to use such value for the position and speed control.

In the field orientation control method of an AC motor according to the present invention, if the injected high-frequency signal is a current input signal, the position of an estimated flux axis is the actual flux axis when the difference between the squares of the two estimated values on the measurement axes i.e., the square of $v^e_{dm}$ and the square of $v^e_{am}$ is minimized.

In the following, it is explained how to divide the signal on the estimated flux axis into factors on the two measurement axes in the stationary reference frame, and how to determine the flux axis from these factors on the two measurement axes without any coordinate transform into synchronously rotating reference frame.

The high-frequency voltage injected on the estimated axis is expressed as follows:

$$\begin{bmatrix} \hat{v}_{dh} \\ \hat{v}_{qh} \end{bmatrix} = \begin{bmatrix} V_{inj} \cos\omega_h t \\ 0 \end{bmatrix} \quad \text{[Equation 10]}$$

wherein $\hat{v}_{dh}$ and $\hat{v}_{qh}$ represent high-frequency voltage signals on the estimated flux axes $\hat{d}^r$ and $\hat{q}^r$ respectively;

$V_{inj}$ represents the magnitude of injected high-frequency voltage; and $\omega_h$ represents the frequency of injected high-frequency voltage.

Figure 12:
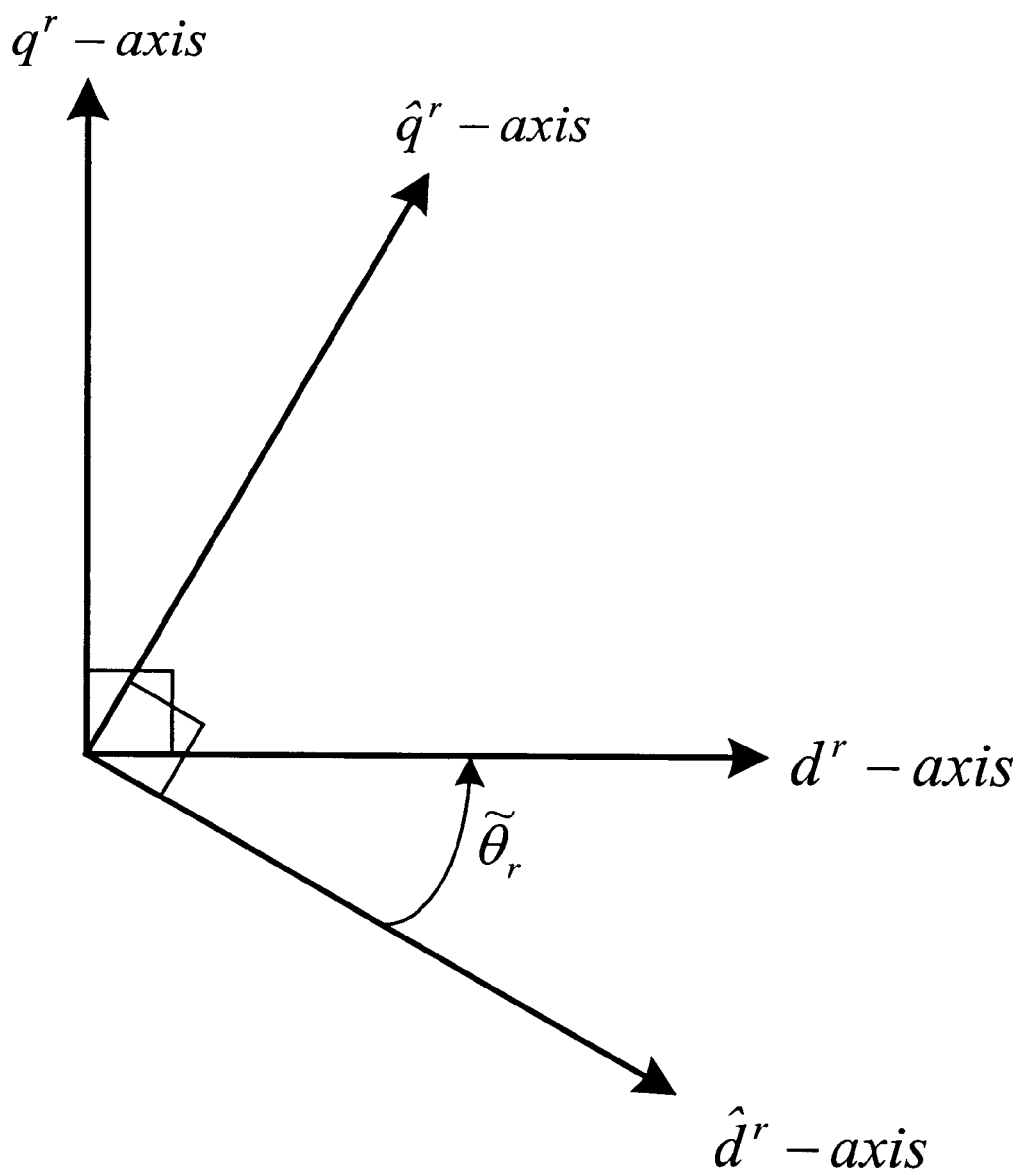
FIG. 12 shows the relation between actual flux axis and estimated flux axis.

Here, the relation between the actual flux axis and the estimated flux axis is shown in FIG. 12. $D^r$-axis and $q^r$-axis are two axes of the actual flux axis, and $\hat{d}^r$-axis and $\hat{q}^r$-axis are two axes of the estimated flux axis. The difference between the actual flux axis and the estimated flux axis, $\tilde{\theta}_r$ is the estimation error of rotor position.

Further, the relation between the physical quantities on the actual flux axis and the estimated flux axis is as follows:

$$\begin{bmatrix} \hat{f}_{ds} \\ \hat{f}_{qs} \end{bmatrix} = \begin{bmatrix} \cos\tilde{\theta}_r & \sin\tilde{\theta}_r \\ -\sin\tilde{\theta}_r & \cos\tilde{\theta}_r \end{bmatrix} \begin{bmatrix} f_{ds} \\ f_{qs} \end{bmatrix} \quad \text{[Equation 11]}$$

wherein $\hat{f}_{ds}$ and $\hat{f}_{qs}$ represent the physical quantities on the estimated flux axis;

$f_{ds}$ and $f_{qs}$ represent the physical quantities on the actual flux axis; and represent the physical quantities on the estimated flux axis;
represent the physical quantities on the actual flux axis; and $\tilde{\theta}_r$ is the estimation error of rotor position.

Further, the operator R(θ) which converts from the stationary reference frame into the synchronously rotating reference frame is as follows:

$$R(\theta) = \begin{bmatrix} \cos\theta & \sin\theta \\ -\sin\theta & \cos\theta \end{bmatrix}$$

Therefore, in case that the high-frequency voltage expressed in the above Equation 10 is injected, the high-frequency component in the stationary reference frame can be calculated according to Equation 3, Equation 11 and the theory of coordinate transform, and then Equation 12 may result through the following steps:

$$\begin{bmatrix} i^s_{dh} \\ i^s_{qh} \end{bmatrix} = \begin{bmatrix} \cos\theta_r & -\sin\theta_r \\ \sin\theta_r & \cos\theta_r \end{bmatrix} \begin{bmatrix} i_{dh} \\ i_{qh} \end{bmatrix} \quad \text{[Equation 12]}$$

$$= \begin{bmatrix} \cos\theta_r & -\sin\theta_r \\ \sin\theta_r & \cos\theta_r \end{bmatrix} \begin{bmatrix} z_{dh} & 0 \\ 0 & z_{qh} \end{bmatrix}^{-1} \begin{bmatrix} v_{dh} \\ v_{qh} \end{bmatrix}$$

$$= \begin{bmatrix} \cos\theta_r & -\sin\theta_r \\ \sin\theta_r & \cos\theta_r \end{bmatrix} \begin{bmatrix} z_{dh} & 0 \\ 0 & z_{qh} \end{bmatrix}^{-1} \begin{bmatrix} \cos\tilde{\theta}_r & \sin\tilde{\theta}_r \\ -\sin\tilde{\theta}_r & \cos\tilde{\theta}_r \end{bmatrix}^{-1} \begin{bmatrix} \hat{v}_{dh} \\ \hat{v}_{qh} \end{bmatrix}$$

$$= \begin{bmatrix} \cos\theta_r & -\sin\theta_r \\ \sin\theta_r & \cos\theta_r \end{bmatrix} \begin{bmatrix} z_{dh} & 0 \\ 0 & z_{qh} \end{bmatrix}^{-1} \begin{bmatrix} \cos\tilde{\theta}_r & \sin\tilde{\theta}_r \\ -\sin\tilde{\theta}_r & \cos\tilde{\theta}_r \end{bmatrix}^{-1} \begin{bmatrix} V_{inj}\cos\omega_h t \\ 0 \end{bmatrix}$$

$$\begin{bmatrix} i^s_{dh} \\ i^s_{qh} \end{bmatrix} = \frac{V_{inj}\cos\omega_h t}{z_{dh}z_{qh}} \begin{bmatrix} z_{qh}\cos\theta_r\cos\hat{\theta}_r + z_{dh}\sin\theta_r\sin\hat{\theta}_r \\ z_{qh}\sin\theta_r\cos\hat{\theta}_r - z_{dh}\cos\theta_r\sin\hat{\theta}_r \end{bmatrix}$$

wherein $i^s_{dh}$ and $i^s_{qh}$ represent the current on d-axis and q-axis in the stationary reference frame respectively;

$i_{dh}$ and $i_{qh}$ represent the current on d-axis and q-axis in the synchronously rotating reference frame respectively;

$Z_{dh}$ and $Z_{qh}$ represent the impedance on d-axis and q-axis in the synchronously rotating reference frame respectively;

$v_{dh}$ and $v_{qh}$ represent the terminal voltage on d-axis and q-axis in the synchronously rotating reference frame respectively; and $\theta_r$ represents the position of actual rotor(flux axis).

The above equation may be expressed in terms of high-frequency resistance and high-frequency inductance as follows:

$$\begin{bmatrix} i^s_{dh} \\ i^s_{qh} \end{bmatrix} = \frac{V_{inj}}{z_{dh}z_{qh}} \begin{bmatrix} (r_{qh}\cos\omega_h t - \omega_h L_{qh}\sin\omega_h t)\cos\theta_r\cos\hat{\theta}_r + (r_{dh}\cos\omega_h t - \omega_h L_{dh}\sin\omega_h t)\sin\theta_r\sin\hat{\theta}_r \\ (r_{qh}\cos\omega_h t - \omega_h L_{qh}\sin\omega_h t)\sin\theta_r\cos\hat{\theta}_r - (r_{dh}\cos\omega_h t - \omega_h L_{dh}\sin\omega_h t)\cos\theta_r\sin\hat{\theta}_r \end{bmatrix} \quad \text{[Equation 13]}$$

In order to determine the flux axis, the reactive power, which utilizes the current and voltage in the stationary reference frame as they are, is used instead of obtaining the difference in squares of current factors on the respective estimated axes. The reactive power of the motor $Q_0$ is as follows:

$$Q_0 = \frac{3}{2}(v^s_d i^s_q - v^s_q i^s_d) \quad \text{[Equation 14]}$$

wherein $v^s_d$ and $v^s_q$ represent the voltage on d-axis and q-axis in the stationary reference frame respectively; and $i^s_d$ and $i^s_q$ represent the current on d-axis and q-axis in the stationary reference frame respectively.

The above reactive power $Q_0$ can be divided into fundamental frequency components and high-frequency components as follows:

$$Q_0 = \frac{3}{2}[(v^s_{d1} + v^s_{dh})(i^s_{q1} + i^s_{qh}) - (v^s_{q1} + v^s_{qh})(i^s_{d1} + i^s_{dh})] \quad \text{[Equation 15]}$$

wherein $v^s_{d1}$ and $v^s_{q1}$ represent the fundamental frequency voltage components on d-axis and q-axis in the stationary reference frame respectively;

$v^s_{dh}$ and $v^s_{qh}$ represent the high-frequency voltage components on d-axis and q-axis in the stationary reference frame respectively;

$i^s_{d1}$ and $i^s_{q1}$ represent the fundamental frequency current components on d-axis and q-axis in the stationary reference frame respectively; and $i^s_{dh}$ and $i^s_{qh}$ represent the high-frequency current components on d-axis and q-axis in the stationary reference frame respectively.

As shown in the above equation, however, signal process is very complicated due to the respective fundamental frequency components and high-frequency components of voltage and current if the reactive power is used as it is. Therefore, signals $s^s_{d0}$ and $s^s_{q0}$ which have only high-frequency components as illustrated in Equation 16 are introduced instead of using the actual voltages $v^s_d$ and $v^s_q$ stationary reference frame to simplify the reactive power $Q_o$ as shown in Equation 17:

$$\begin{bmatrix} s^s_{d0} \\ s^s_{q0} \end{bmatrix} = \begin{bmatrix} \cos\hat{\theta}_r & -\sin\hat{\theta}_r \\ \sin\hat{\theta}_r & \cos\hat{\theta}_r \end{bmatrix} \begin{bmatrix} \cos\omega_h t \\ 0 \end{bmatrix} \quad \text{[Equation 16]}$$

$$Q_s = (s^s_{q0} i^s_d - s^s_{d0} i^s_q) = [s^s_{q0}(i^s_{d1} + i^s_{dh}) - s^s_{d0}(i^s_{q1} + i^s_{qh})] \quad \text{[Equation 17]}$$

wherein $\hat{v}_r$ represents the position of the estimated rotor.

The above Equation 17 can be calculated by using high-frequency components in the stationary reference frame in Equations 16 and 13 as follows:

$$\begin{aligned} Q_s &= \cos\omega_h t\left(\sin\hat{\theta}_r \hat{i}^s_{d1} - \cos\hat{\theta}_r \hat{i}^s_{q1}\right) + \\ &\quad \frac{V_{inj}}{z_{dh}z_{qh}} \left\{ \begin{array}{l} r_{qh}\cos^2\omega_h t[\cos\hat{\theta}_r(\sin\hat{\theta}_r\cos\theta_r - \sin\hat{\theta}_r\cos\theta_r)] + \\ r_{dh}\cos\omega_h t[\sin\hat{\theta}_r(\sin\hat{\theta}_r\sin\theta_r + \cos\hat{\theta}_r\cos\theta_r)] - \\ \omega_h L_{dh}\sin\omega_h t\cos\omega_h t[\sin\hat{\theta}_r(\sin\hat{\theta}_r\sin\theta_r + \cos\hat{\theta}_r\cos\theta_r)] - \\ \omega_h L_{qh}\sin\omega_h t\cos\omega_h t[\cos\hat{\theta}_r(\sin\hat{\theta}_r\cos\theta_r - \cos\hat{\theta}_r\sin\theta_r)] \end{array} \right\} \\ &= (-\cos\omega_h t)\hat{i}^s_{q1} + \frac{V_{inj}}{z_{dh}z_{qh}}\{\cos^2\omega_h t(r_{dh} - r_{qh}) - \sin\omega_h t\cos\omega_h t(\omega_h L_{dh} - \omega_h L_{qh})\}\sin\tilde{\theta}_r\cos\tilde{\theta}_r \\ &= (-\cos\omega_h t)\hat{i}^s_{q1} + \frac{V_{inj}}{4z_{dh}z_{qh}}\{r_{diff}(1 + \cos 2\omega_h t) - \omega_h L_{diff}\sin 2\omega_h t\}\sin 2\tilde{\theta}_r \end{aligned} \quad \text{[Equation 18]}$$

wherein $\hat{i}_{dl}^s$ and $\hat{i}_{ql}^s$ represent the fundamental-frequency component of the current on d- and q-axes in the stationary reference frame;

$r_{diff}$ represents $r_{dh}$-$r_{qh}$, the difference between high-frequency resistances; and $L_{diff}$ represents $L_{dh}$-$L_{qh}$, the difference between high-frequency inductances.

In the above equation, $\hat{i}_{q1}$ represents the torque current used in the current control. Therefore, in order to eliminate this component, the calculation shown in Equation 19 is performed and the result is passed through the low pass filter. Then, the result can be obtained as shown in Equation 20.

$$Q'_S = Q_S + (\cos\omega_h t)\hat{i}_{q1}$$
$$= \frac{V_{inj}}{4z_{dh}z_{qh}}\{r_{diff}(1+\cos2\omega_h t) - \omega_h L_{diff}\sin2\omega_h t\}\sin2\tilde{\theta}_r$$ [Equation 19]

$$LPF(Q'_S) = \frac{V_{inj}}{4z_{dh}z_{qh}}r_{diff}\sin2\tilde{\theta}_r$$ [Equation 20]

If the frequency of the injected high-frequency signal is high enough, the impedance in Equation 20 can be approximated as follows in steady state.

$$z_{dh} = r_{dh} + j\omega_h L_{dh} \approx j\omega_h L_{dh}$$
$$z_{qh} = r_{qh} + j\omega_h L_{qh} \approx j\omega_h L_{qh}$$ [Eqution 21]

Therefore, Equation 20 can be approximated as follows:

$$LPF(Q'_S) = -\frac{V_{inj}}{4\omega_h^2 L_{dh}L_{qh}}r_{diff}\sin2\tilde{\theta}_r$$ [Equation 22]

If the estimation error is very small, the above Equation 22 can be linearized as follows:

$$LPF(Q'_s) = -\frac{V_{inj}}{2\omega_h^2 L_{dh}L_{qh}}r_{diff}\tilde{\theta}_r$$ [Equation 23]

From the above Equation 23, it is recognized that the value of LPF($Q_s$') becomes minimum i.e., 0(zero) if the value of $\theta_r$ is minimum i.e., 0(zero). Therefore, the estimated flux axis where LPF($Q_s$') is zero would be the actual flux axis.

Figure 13:
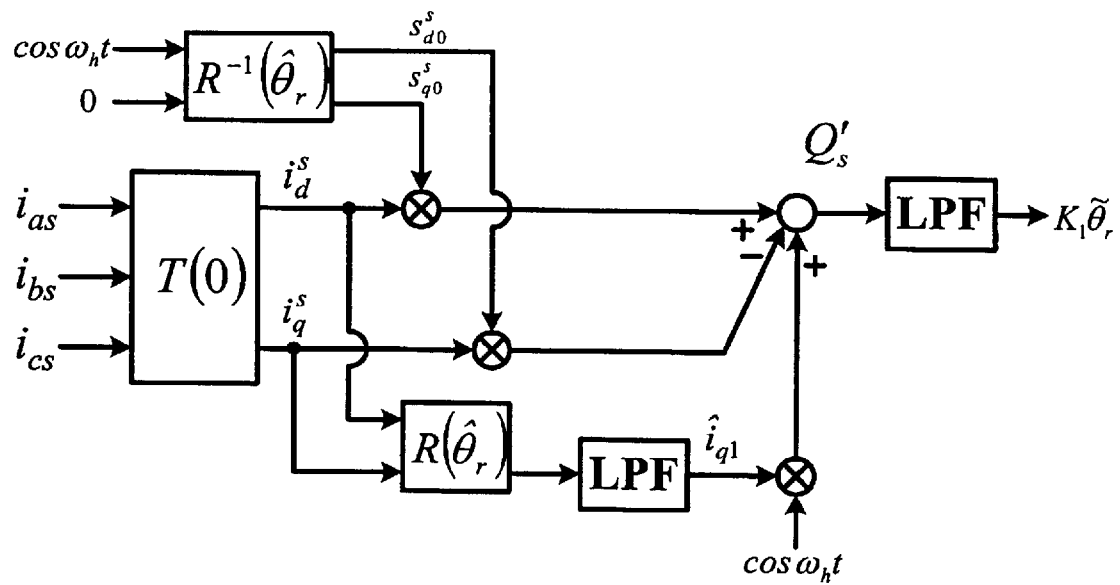
FIG. 13 shows the block diagram representing the signal process in case that the signal whose phase is identical to the phase of the injected high-frequency voltage is introduced.

The block diagram which is an embodiment of the above signal process is shown in FIG. 13.

Here, as it is mentioned above, R($\theta$) is the operator which converts from the stationary reference frame into the synchronously rotating reference frame, and T(0) is the operator which converts from the three-phase reference frame into the stationary reference frame as follows:

$$T(0) = \frac{2}{3}\begin{bmatrix} 1 & -\frac{1}{2} & -\frac{1}{2} \\ 0 & \frac{\sqrt{3}}{2} & -\frac{\sqrt{3}}{2} \end{bmatrix}$$

As it is mentioned above, the proportional constant is very small due to the coefficient $r_{diff}$ in the case where a signal whose phase is identical to the phase of the injected high-frequency voltage. Therefore, at this time, signals $s_d^s$ and $s_q^s$ whose phases are different from the phase of the injected high-frequency voltage by $\pi/2$ are in turn introduced as shown in Equation 16a instead of signals $s_{d0}^s$ and $s_{q0}^s$ whose phases are identical to the phase of the injected high-frequency voltage:

$$\begin{bmatrix} s_d^s \\ s_q^s \end{bmatrix} = \begin{bmatrix} \cos\theta_r & -\sin\theta_r \\ \sin\theta_r & \cos\theta_r \end{bmatrix}\begin{bmatrix} \sin\omega_h t \\ 0 \end{bmatrix}$$ [Equation 16a]

Signal Q which is similar conceptually to $Q_s$ in Equation 17 is calculated by using the signal in the above equation and the high-frequency component of current in the stationary reference frame as follows:

$$Q = [(s_q^s \hat{i}_{d1}^s - s_d^s \hat{i}_{q1}^s) + (s_q^s \hat{i}_{dh}^s - s_d^s \hat{i}_{qh}^s)]$$
$$= \left[\sin\omega_h t(\sin\theta_r \hat{i}_{d1}^s - \cos\theta_r \hat{i}_{q1}^s) + \frac{V_{inj}}{4z_{dh}z_{qh}}\{r_{diff}\sin2\omega_h t - \omega_h L_{diff}(1-\cos2\omega_h t)\}\sin2\tilde{\theta}_r\right]$$
$$Q = \left[-(\sin\omega_h t)\hat{i}_{q1}^r + \frac{V_{inj}}{4z_{dh}z_{qh}}\{r_{diff}\sin2\omega_h t - \omega_h L_{diff}(1-\cos2\omega_h t)\}\sin2\tilde{\theta}_r\right]$$

In the same manner, in order to eliminate the effect of the torque current, the calculation illustrated in Equation 19a is conducted and the result is passed through the low pass filter. Then, the result can be obtained as shown in Equation 20a:

$$Q' = Q + (\sin\omega_h t)\hat{i}_{qs1}^r$$ [Equation 19a]
$$= \frac{V_{inj}}{4z_{dh}z_{qh}}\{r_{diff}\sin2\omega_h t - \omega_h L_{diff}(1-\cos2\omega_h t)\}\sin2\tilde{\theta}_r$$

$$LPF(Q') = -\frac{V_{inj}}{4z_{dh}z_{qh}}\omega_h L_{diff}\sin2\tilde{\theta}_r$$ [Equation 20a]

Equation 20a can be approximated to Equation 22a if the impedance is approximated:

$$LPF(Q') = \frac{V_{inj}L_{diff}}{4\omega_h L_{dh}L_{qh}}\sin2\tilde{\theta}_r$$ [Equation 22a]

Further, if the estimation error is small, the above equation can be linearized as shown in Equation 23a:

$$LPF(Q') \approx \frac{V_{inj}L_{diff}}{2\omega_h L_{dh}L_{qh}}\tilde{\theta}_r$$ [Equation 23a]

It is recognized from the comparison of the methods illustrated by Equation 23 and Equation 23a that these methods are the same in that the values is proportional to the estimation error, but that the proportional constant is different. The proportional constant in Equation 23 is proportional to the high-frequency resistance and inversely proportional to the square of the injected signal frequency, whereas the proportional constant in Equation 23a is proportional to the high-frequency inductance and inversely proportional to the injected signal frequency. When the high-frequency voltage is injected to a motor, the difference in the high-frequency inductance is much larger than that in the high-frequency resistance. Therefore, the proportional constant of Equation 23a is much larger than that of Equation 23 under the same condition. Since it is better to have a signal with large magnitude for the purpose of estimation, the method according to Equation 23a is preferred in view of performance.

Figure 14:
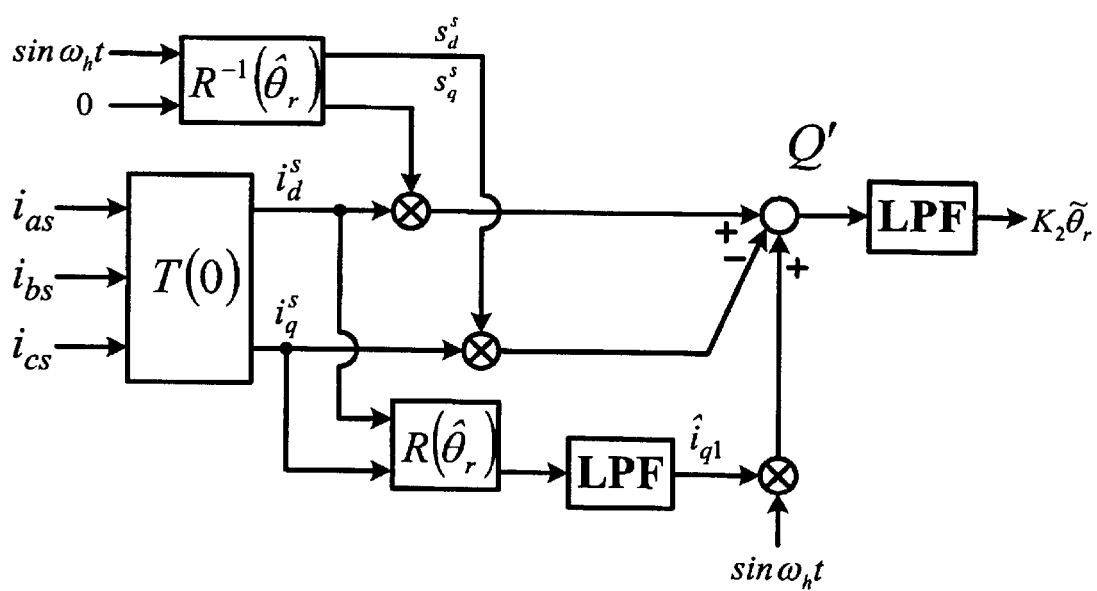
FIG. 14 shows the block diagram representing the signal process in case that the signal whose phase is different from the phase of the injected high-frequency voltage by $\pi/2$ is introduced.
Figure 15:
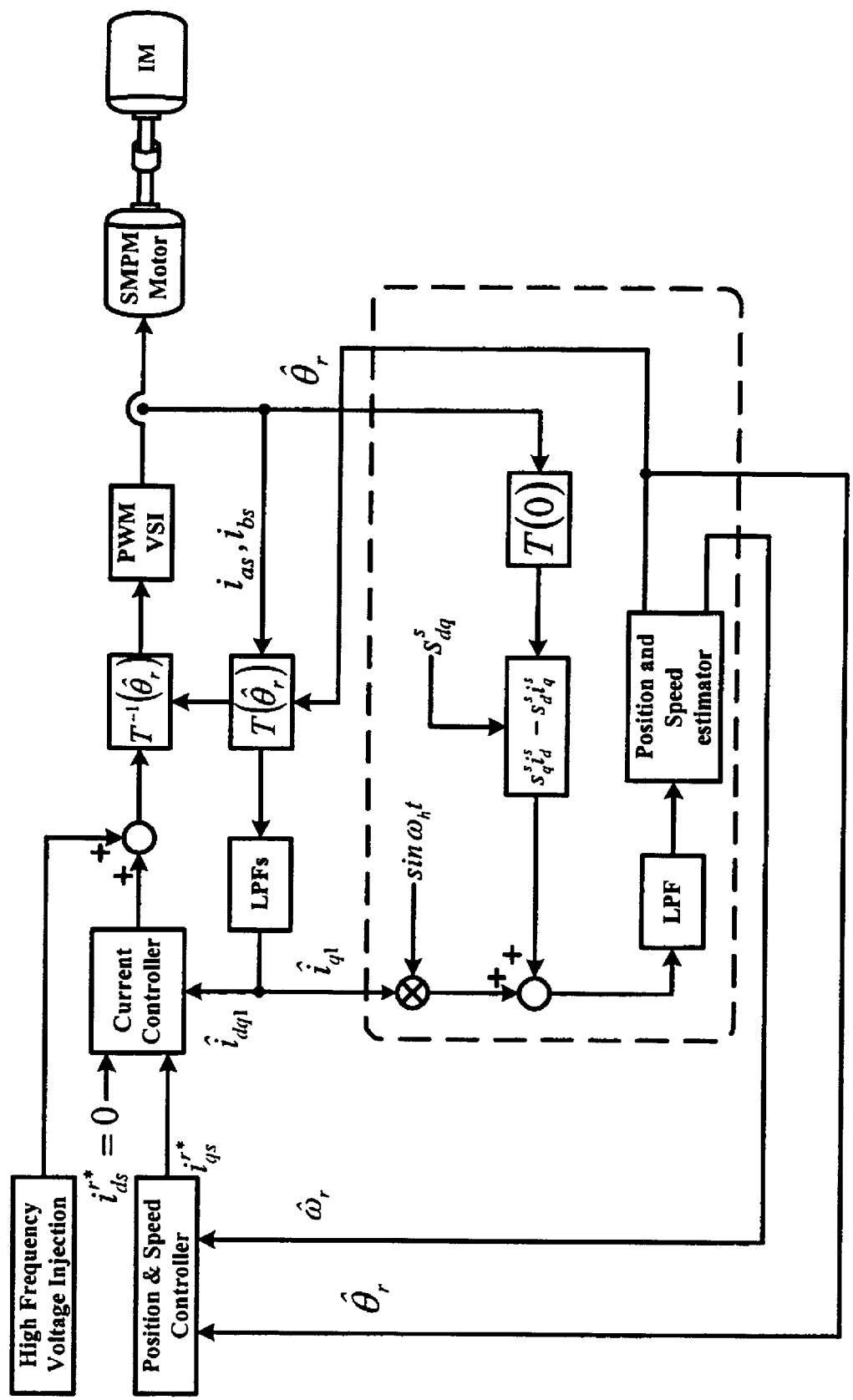
FIG. 15 shows the entire system in case that the signal whose phase is different from the phase of the injected high-frequency voltage by $\pi/2$ is introduced.

The block diagram illustrating an embodiment of the method according to Equation 23a is shown in FIG. 14. The entire system comprising the field orientation controller according to Equation 23a is shown in FIG. 15.

Here, as it is mentioned above, $R(\theta)$ is the operator which converts from the stationary reference frame into the synchronously rotating reference frame; $T(0)$ is the operator which converts from the three-phase reference frame into the stationary reference frame; and $T(\theta)$ is the operator which converts from three-phase reference frame into synchronously rotating reference frame as follows:

$$T(\theta) = R(\theta)T(0) = \frac{2}{3}\begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix}$$

The above AC motor control system for an AC motor comprises a current controller which conducts control so that constant high-frequency signals may be injected to the AC motor; and a field orientation controller which receives the output current of the AC motor, divides the output current from the AC motor into $i_d^s$ and $i_q^s$, the factors on two measurement flux axes in the stationary reference frame, divides the signal whose phase is different from the phase of the injected high-frequency voltage by $\pi/2$ into $s_d^s$ and $s_q^s$, the factors on two measurement flux axes in the stationary reference, obtains signal Q which is the difference between the product of $s_q^s$ by $i_d^s$ and the product of $s_d^s$ by $i_q^s$, and determines the position and the speed of the actual flux axis by the signal Q.

Further, the field orientation controller may comprise a low pass filter(LPF) which eliminates the torque current used in the current controller from the signal Q.

Further, the field orientation controller system may comprise a position and speed controller which controls the position and the speed of the rotor of the AC motor by using the inputted position and speed of the actual flux axis determined in the said field orientation controller.

The embodied system is very simple because the said field orientation controller does not use an coordinate transformer (90) which converts the stationary reference frame into the synchronously rotating reference frame and divides it into a factor on the axis which is $\pi/4$ behind the estimated flux axis and a factor on the axis which is $\pi/4$ ahead of the estimated flux axis, which is different from the field orientation controller shown in FIG. 8.

Figure 16:
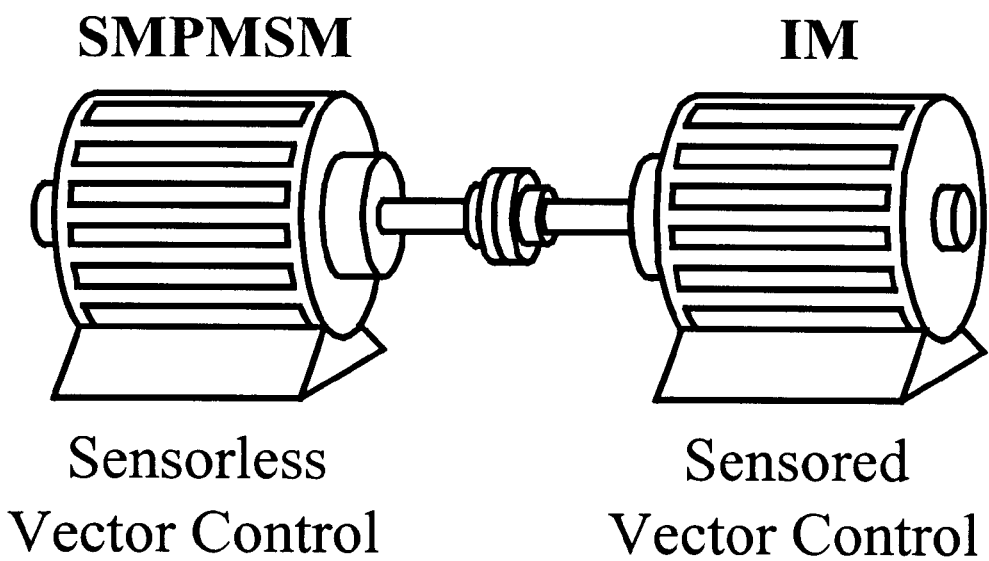
FIG. 16 shows the motor used in the Experimental Examples.

The following experimental examples are the result from the motor field orientation method using the system shown in FIG. 15. The main parameters of the motors(SMPMM and IM, shown in FIG. 16) used in these experiments are listed in the following table 1:

TABLE 1

The Coefficients of the Test Motors

| | |
|---|---|
| Rated Power | 11 [kW] |
| Rated Torque | 70 [Nt-m] |
| Number of Poles | 8 |
| Rated Current | 58.6 [A(rms)] |
| Rated Speed | 1500 [r/min] |
| Torque Coefficient | 1.25 [Nt-m/A(rms)] |
| Moment of Inertia | 0.0281 [kg-m2] |
| Stator Phase Resistance | 0.0217 [Ω] |
| Stator Phase Inductance | 0.49 [mH] |

Experiment 1

Verification of Impedance Variation in High-Frequency Region

Figure 17:
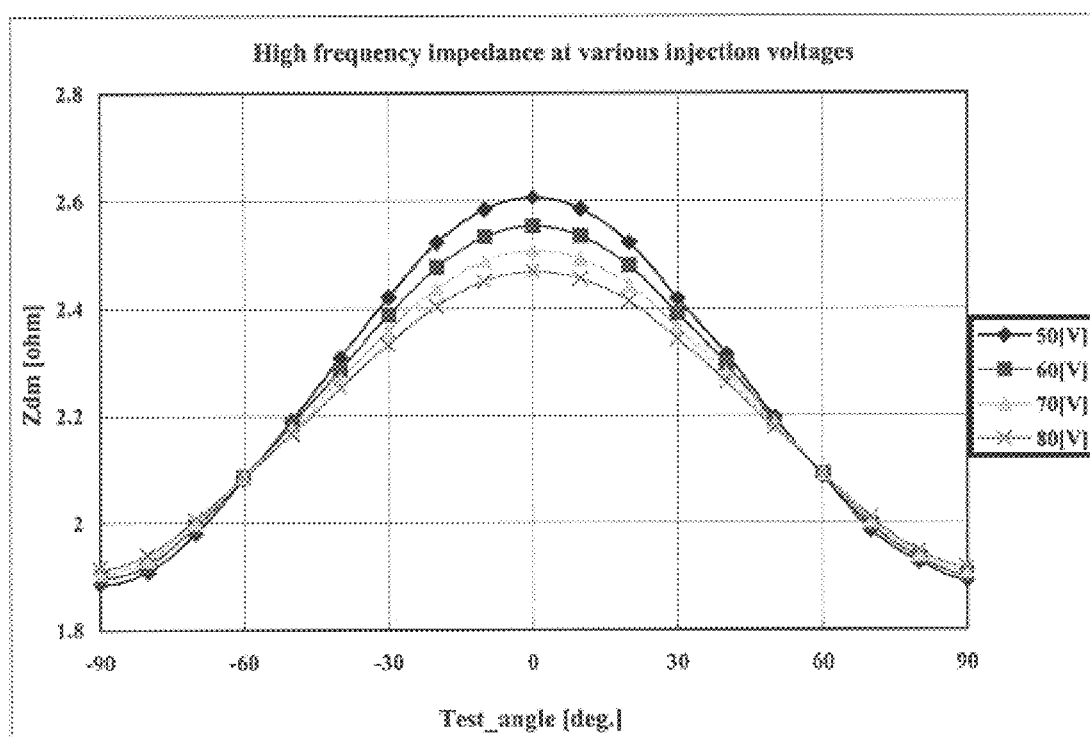
FIG. 17 shows distribution characteristic of impedance depending on the magnitude of the injected high-frequency voltage.

The measured distribution characteristic of high-frequency impedance of the above motor is shown in FIG. 17. In this figure, the horizontal axis is the relative position of the flux axis where high-frequency voltage is injected in relation to the actual flux axis. The vertical axis is the magnitude of high-frequency impedance in the flux axis where high-frequency voltage is injected. It is demonstrated that, regardless of the magnitude of the injected high-frequency voltage, the magnitude of impedance is maximized at the actual flux axis(test angle=0°) and minimized at the axis orthogonal to the actual flux axis(test angle=90°).

Figure 18:
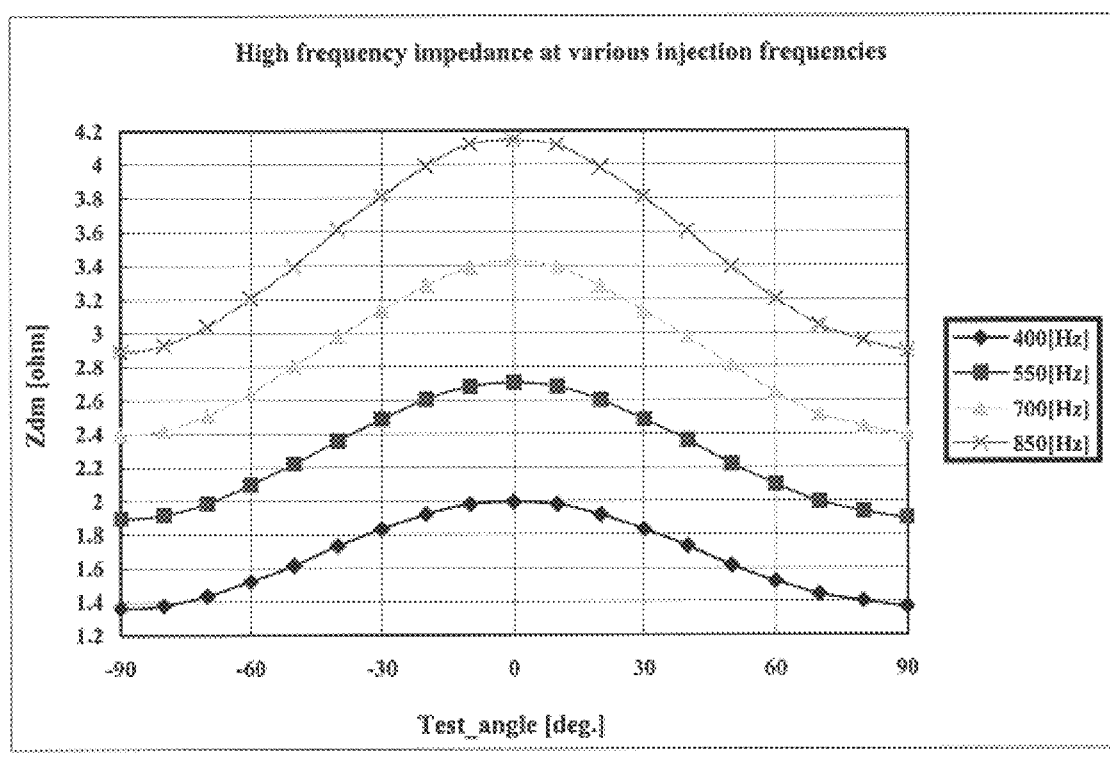
FIG. 18 shows distribution characteristic of impedance depending on the frequency of the injected high-frequency voltage.

The distribution characteristic of impedance depending on the frequency of the injected high-frequency voltage is shown in FIG. 18. Similarly to the FIG. 17, the magnitude of high-frequency impedance is maximized at the actual flux axis(test angle=0°).

Figure 19:
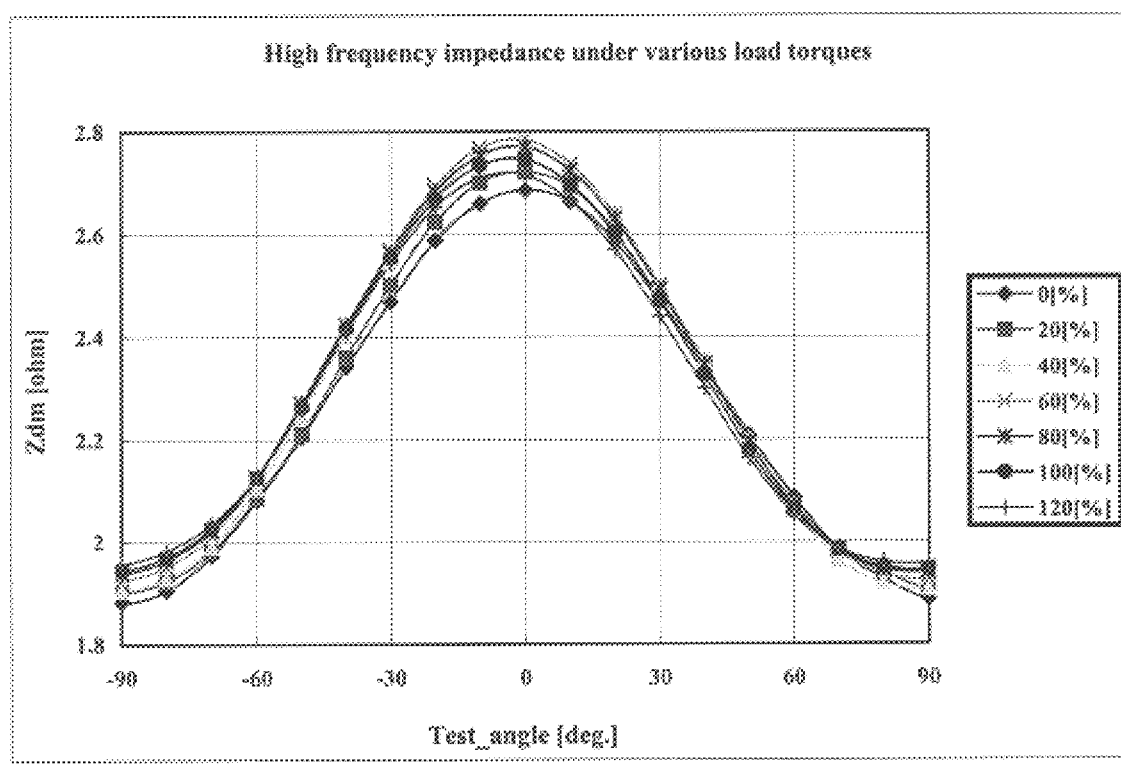
FIG. 19 shows distribution characteristic of impedance depending on the load torque.

The distribution characteristic of high-frequency impedance depending on the variation of load torque when the high-frequency voltage whose magnitude and frequency is fixed(40[V], 550[Hz]) is injected to the same motor is shown in FIG. 19. Similarly, the magnitude of high-frequency impedance is maximized at the actual flux axis and minimized at the axis orthogonal to the actual flux axis.

Experiment 2

Field Orientation Control

According to Equation 23a, signals $s_d^s$ and $s_q^s$ whose phases differ from the phase of the injected high-frequency voltage by $\pi/2$ are used to conduct the experiment of field orientation control.

Figure 20:
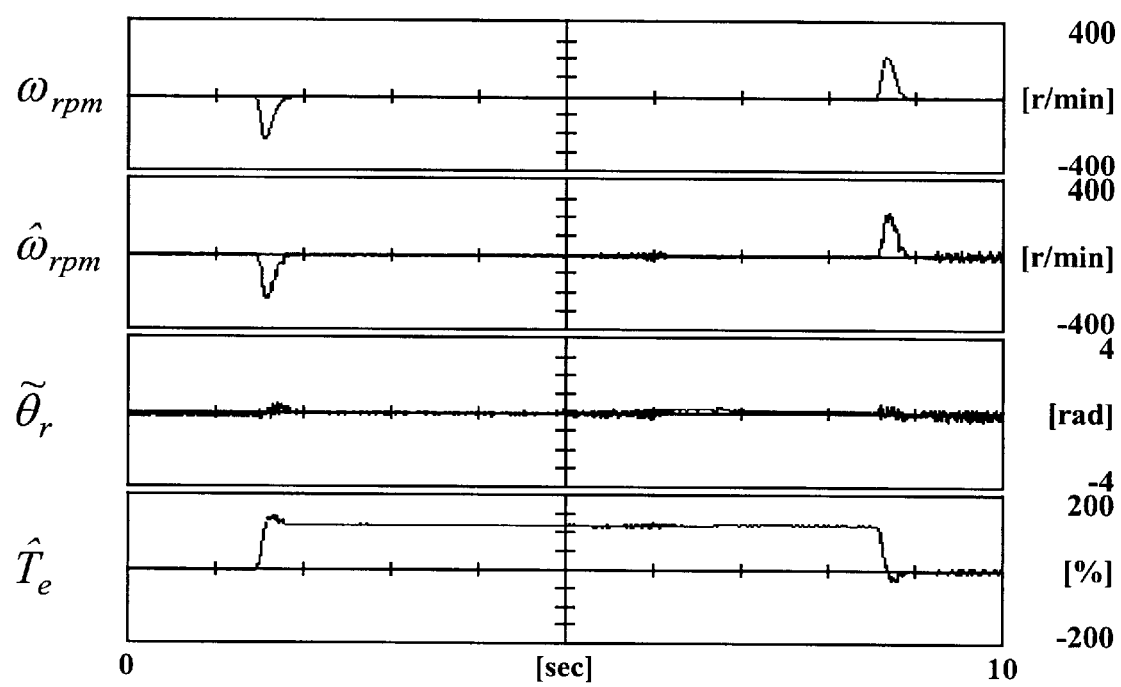
FIG. 20 shows the result of zero speed control under 120% step load condition in case that the signal whose phase is different from the phase of the injected high-frequency voltage by $\pi/2$ is introduced.

While maintaining the speed command as 0(zero), the load torque whose magnitude is 120% of the rated torque magnitude in Table 1 is injected and then removed. The result is shown in FIG. 20 in which $\omega_{rpm}$ represents measured speed;

$\hat{\omega}_{rpm}$ represents estimated speed;

$\hat{\theta}_r$ represents estimation error; and $$\hat{T}_e$$

represents load torque. It demonstrates that estimation error is very small not only at the steady state but also at the transient state.

Figure 21:
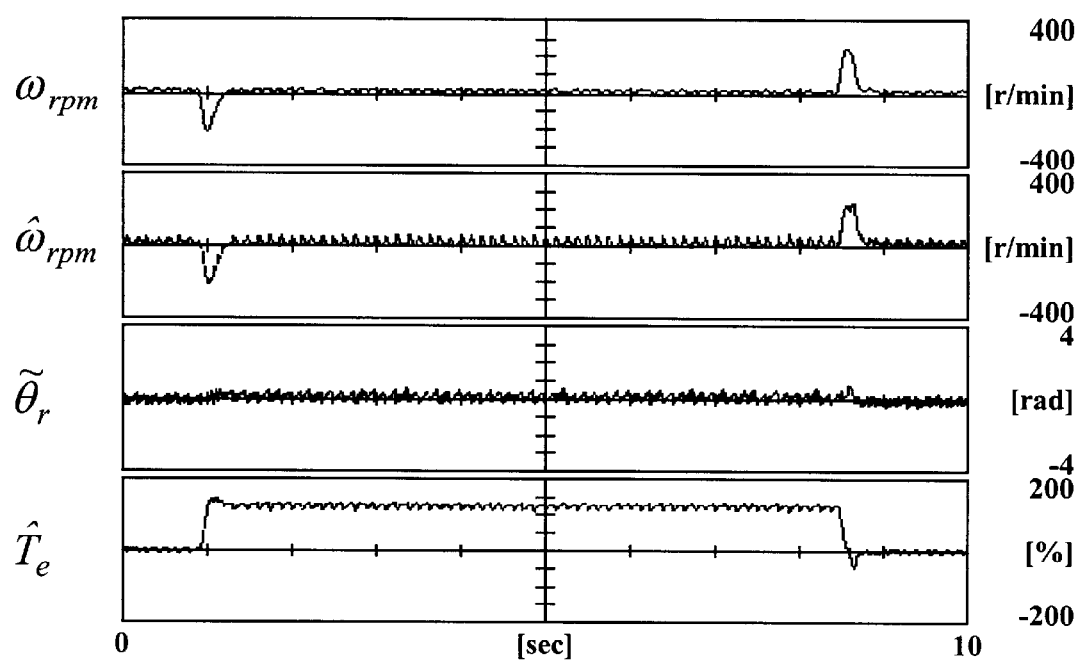
FIG. 21 shows the result of low speed control under 120% step load condition in case that the signal whose phase is different from the phase of the injected high-frequency voltage by $\pi/2$ is introduced.

While maintaining the speed command as 20[r/min], the load torque whose magnitude is 120% of the rated torque magnitude in Table 1 is injected and then removed. The result is shown in FIG. 21 wherein $\omega_{rpm}$ represents measured speed;

$$\hat{\omega}_{rpm}$$

represents estimated speed;

$$\tilde{\theta}_r$$

represents estimation error; and $$\hat{T}_e$$

represents load torque. It also demonstrates that estimation error is very small not only at the steady state but also at the transient state.

Figure 22:
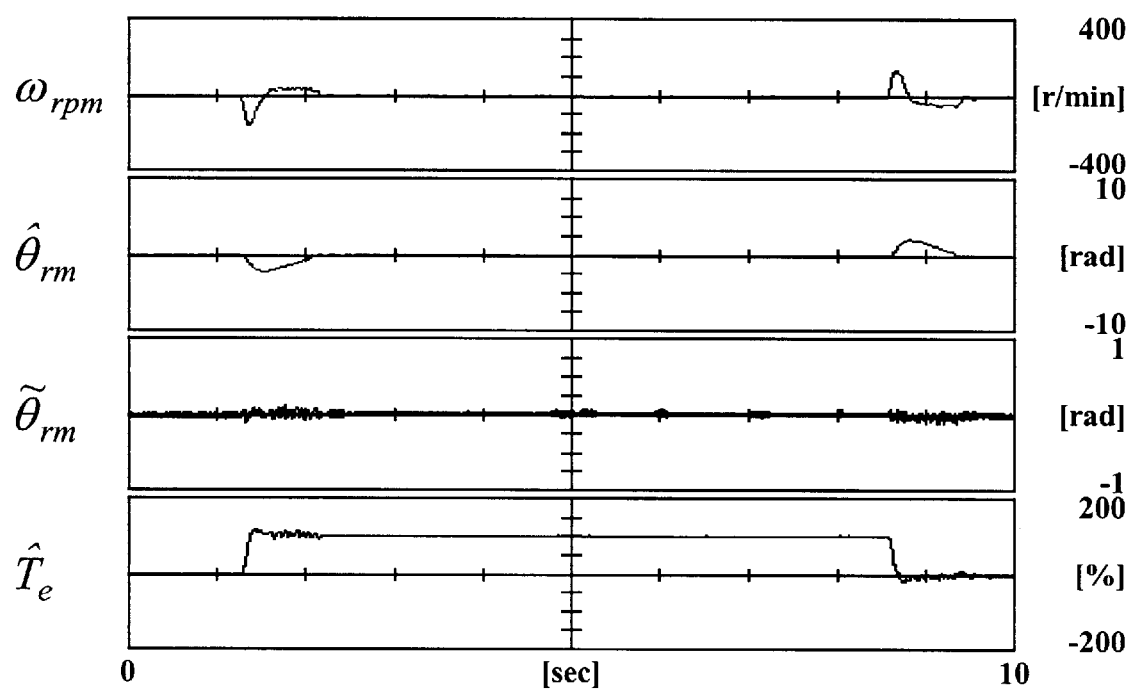
FIG. 22 shows the result of zero position control under 100% step load condition in case that the signal whose phase is different from the phase of the injected high-frequency voltage by π/2 is introduced.

While maintaining the position command as 0(zero), the load torque whose magnitude is 100% of the rated torque magnitude in Table 1 is injected and then removed. The result is shown in FIG. 22 wherein $\omega_{rpm}$ represents measured speed;

$$\hat{\theta}_{rm}$$

represents estimated position of rotor of motor;

$$\tilde{\theta}_{rm}$$

represents estimation error of position of rotor; and $$\hat{T}_e$$

represents load torque. It also demonstrates that estimation error is very small not only at the steady state but also at the transient state.

Figure 23:
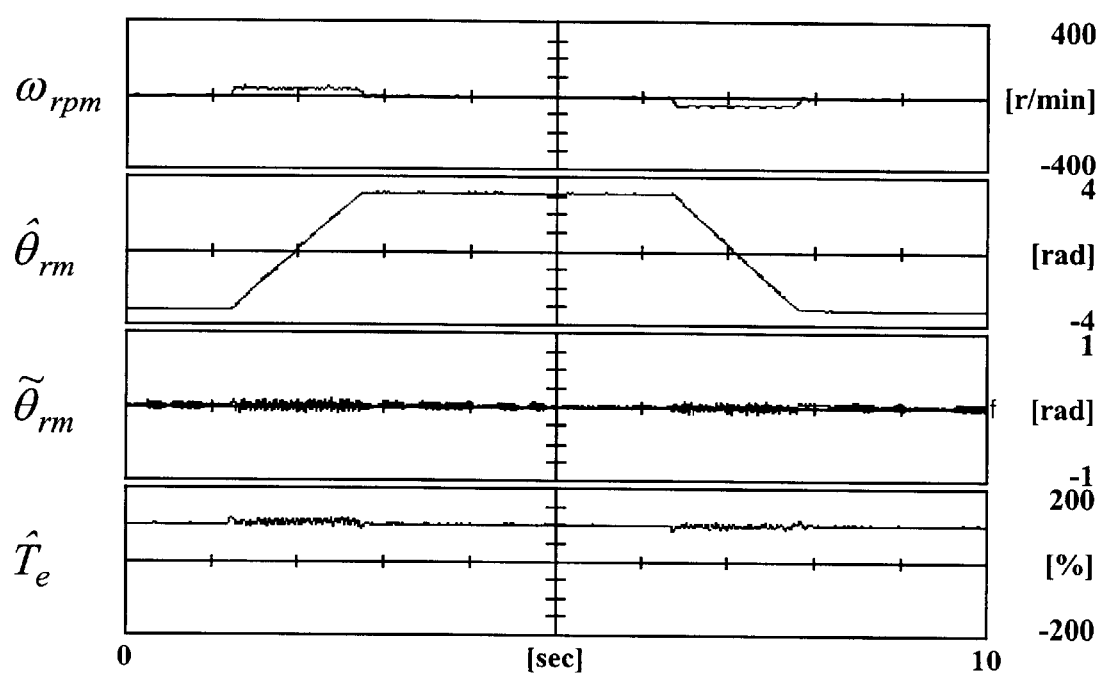
FIG. 23 shows the result of control depending on the position command under 100% load condition.

In the state where the load torque whose magnitude is 100% of the rated torque magnitude in Table 1 is being injected, the position command is varied from −π[rad] to π[rad] for the experiment. The result is shown in FIG. 23 wherein $\omega_{rpm}$ represents measured speed;

$$\hat{\theta}_{rm}$$

represents estimated position of rotor of motor;

$$\tilde{\theta}_{rm}$$

represents estimation error of position of rotor; and $$\hat{T}_e$$

represents load torque. It also demonstrates that estimation error is very small not only at the steady state but also at the transient state.

The foregoing is no more than a preferred embodiment of the present invention and various changes may be made within the extent not exceeding the technical scope of the present invention. In particular, in the above preferred embodiment, a method of injecting a high-frequency voltage has been provided, but an AC motor also may be controlled by injecting a high-frequency current.

According to the method and the system thereof for sensorless AC motor control, high control performance may be achieved regardless of load conditions by controlling the current on the control flux and resultantly by controlling the AC motor.

What is claimed is:

1. A field orientation control method for an AC motor, comprising the steps of:
   (a) assuming an estimated flux axis in the synchronously rotating reference frame;
   (b) injecting a high-frequency fluctuating signal to the said estimated flux axis;
   (c) determining the flux axis using current, voltage or impedance on the estimated flux axis in the synchronously rotating reference frame generated by the injected high-frequency signal; and
   (d) determining the position and the speed of the rotor based on the flux axis thus located.

2. The field orientation control method for an AC motor according to claim 1, wherein the said third step (c) of determining the flux axis uses the variation of impedance caused by the error between the actual flux axis and the estimated flux axis.

3. The field orientation control method for an AC motor according to claim 1, wherein the said third step (c) to determine the flux axis further comprises:
   (a) a process in which the fluctuating signal on the estimated flux axis is divided into two factors on two orthogonal measurement axes and the motor impedances on two measurement axes are calculated from the measured values of the said factors on two measurement axes; and
   (b) a process in which the flux axis is determined through the difference in motor impedances calculated on the two measurement axes.

4. The field orientation control method for an AC motor according to claim 3, wherein the factors on the two measurement axes comprise factors on the first measurement axis which leads the estimated flux axis by π/4 and the second measurement axis which lags the said estimated flux axis by π/4.

5. The field orientation control method for an AC motor according to claim 4, wherein the flux axis is determined to be the estimated flux axis, on which the difference in motor impedances on the two measurement axes is minimum, if the said two measurement axes comprise the said first measurement axis and the said second measurement axis.

6. The field orientation control method for an AC motor according to claim 1, wherein the high-frequency fluctuating signal injected to the estimated flux axis is a voltage input signal and, in such case, the measured values on the said two measurement axes are currents.

7. The field orientation control method for an AC motor according to claim 6, wherein the estimated flux axis, on which the difference between the square of the measured values (the currents) on the measurement axes is minimum, is determined to be the flux axis, because the difference between the square of the measured current on each measurement axis (the difference between the square of $\tilde{i}^e_{dm}$ and the square of $\tilde{i}^e_{qm}$) is proportional to the measured admittance on each measurement axis when the high-frequency fluctuating signal injected to the estimated flux axis in the synchronously rotating reference frame is a voltage input signal.

8. The field orientation control method for an AC motor according to claim 1, wherein the high-frequency fluctuating signal injected to the estimated flux axis in the synchronously rotating reference frame is a current input signal and, in such case, the measured values on the said two measurement axes are voltages.

9. The field orientation control method for an AC motor according to claim 8, wherein the estimated flux axis, on which the difference between the square of the measured values (the voltages) on the measurement axes (the difference between the square of $v^e_{dm}$ and the square of $v^e_{qm}$) is minimum, is determined to be the flux axis, when the high-frequency fluctuating signal injected to the estimated flux axis in a synchronously rotating reference frame is a current input signal.

10. The field orientation control method for an AC motor according to claim 1, wherein the said third step (c) to determine the flux axis further comprises the processes of:
   (a) dividing current or voltage on the estimated flux into factors on the two measurement axes in the stationary reference frame; and
   (b) determining the flux axis from the said factors of the two measurement axes without any coordinate transform into synchronously rotating reference frame.

11. The field orientation control method for an AC motor according to claim 10, wherein the said two measurement axes are orthogonal to each other.

12. The field orientation control method for an AC motor according to claim 10, wherein the phase of one of the two measurement axes in the stationary reference frame is identical to the phase of one of the components of poly-phase AC power.

13. The field orientation control method for an AC motor according to claim 10, wherein the injected high-frequency signal is a voltage input signal and the measured value on the said two measurement axes is current.

14. The field orientation control method for an AC motor according to claim 13, wherein the said third step (c) to determine the flux axis further comprises the processes of:
   (a) dividing the signal whose phase is identical to the phase of the injected high-frequency voltage into signals $s_{d0}^s$ and $s_{q0}^s$ which are factors on the two measurement flux axes in the stationary reference;
   (b) dividing the current on the estimated flux axis into $i_d^s$ and $i_q^s$ which are factors on two measurement flux axes;
   (c) obtaining signal $Q_s$ which is the difference between the product of $s_{q0}^s$ by $i_d^s$ and the product of $s_{d0}^s$ by $i_q^s$; and
   (d) determining the flux axis from the signal $Q_s$.

15. The field orientation control method for an AC motor according to claim 13, wherein the said third step (c) to determine the flux axis further comprises the processes of:
   (a) dividing the signal whose phase is different from the phase of the injected high-frequency voltage by $\pi/2$ into signals $s_d^s$ and $s_q^s$ which are factors on the two measurement flux axes in the stationary reference;
   (b) dividing the current on the estimated flux axis into $i_d^s$ and $i_q^s$ which are factors on two measurement flux axes;
   (c) obtaining the signal Q which is the difference between the product of $s_q^s$ by $i_d^s$ and the product of $s_d^s$ by $i_q^s$; and
   (d) determining the flux axis from the signal Q.

16. The field orientation control method for an AC motor according to claim 10, wherein the injected high-frequency signal is a current input signal and the measured value on the said two measurement axes is voltage.

17. A field orientation control system for an AC motor, comprising:
   a current controller which performs control so that a high-frequency voltage of a constant magnitude may be inputted to the AC motor; and
   a field orientation controller which receives the output current from the AC motor, divides the output current from the AC motor into factors of an estimated flux axis and an axis orthogonal to the estimated flux axis, and determines the position and the speed of the actual flux axis by using the difference between the current factors on the estimated flux axis and the axis orthogonal to the estimated flux axis.

18. The field orientation control system for an AC motor according to claim 17, wherein the said field orientation controller comprises:
   a coordinate transformer which receives the output current from the AC motor, converts such current from a stationary reference frame into the synchronously rotating reference frame, and divides the said output current into factors on an axis ahead of the estimated flux axis by $\pi/4$ and on an axis behind the estimated flux axis by $\pi/4$;
   a band pass filter which filters the certain frequency band component of the output current factors of the said coordinate transformer;
   a correction controller which determines the speed of the rotor from the output value of the said band pass filter; and
   an integrator which determines the position of the rotor from the actual rotor speed out of the said correction controller.

19. The field orientation controller system for an AC motor according to claim 17, which further comprises a position and speed controller which controls the position and the speed of the rotor in the AC motor by receiving the position and the speed of the actual flux axis determined in the field orientation controller.

20. The field orientation controller system for an AC motor according to claim 18, which further comprises a position and speed controller which controls the position and the speed of the rotor in the AC motor by receiving the position and the speed of the actual flux axis determined in the field orientation controller.

21. A field orientation control system for an AC motor, comprising:
   a current controller which performs control so that a high-frequency voltage of a constant magnitude may be inputted to the AC motor; and
   a field orientation controller which receives the output current of the AC motor, divides the output current from the AC motor into $i_d^s$ and $i_q^s$ which are factors on two measurement flux axes in the stationary reference frame, divides the signal whose phase is different from the phase of the injected high-frequency voltage by $\pi/2$ into $s_d^s$ and $s_q^s$ which are factors on two measurement flux axes in the stationary reference, obtains signal Q which is the difference between the product of $s_q^s$ by $i_d^s$ and the product of $s_d^s$ by $i_q^s$, and determines the position and the speed of the flux axis from the signal Q.

22. The field orientation controller system for an AC motor according to claim 21, wherein the field orientation controller further comprises a low pass filter(LPF) which eliminates the torque current used in the current controller from the signal Q.

23. The field orientation controller system for an AC motor according to claim 21, which further comprises a position and speed controller which controls the position and the speed of the rotor in the AC motor by receiving the position and the speed of the actual flux axis determined in the field orientation controller.

24. The field orientation controller system for an AC motor according to claim 22, which further comprises a position and speed controller which controls the position and the speed of the rotor in the AC motor by receiving the position and the speed of the actual flux axis determined in the field orientation controller.

* * * * *